(12) United States Patent
Cimatti

(10) Patent No.: US 8,939,867 B2
(45) Date of Patent: Jan. 27, 2015

(54) AUTOMATIC MANUAL TRANSMISSION FOR A HYBRID CAR PROVIDED WITH AN INTERNAL COMBUSTION ENGINE AND WITH AN ELECTRICAL MACHINE

(71) Applicant: Ferrari S.p.A., Modena (IT)

(72) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/933,792

(22) Filed: Jul. 2, 2013

(65) Prior Publication Data
US 2014/0011631 A1   Jan. 9, 2014

(30) Foreign Application Priority Data
Jul. 3, 2012   (IT) .............................. BO2012A0363

(51) Int. Cl.
| | |
|---|---|
| B60W 10/02 | (2006.01) |
| B60W 10/06 | (2006.01) |
| B60W 10/08 | (2006.01) |
| B60W 10/11 | (2012.01) |
| B60W 20/00 | (2006.01) |
| B60K 6/383 | (2007.10) |
| B60K 6/387 | (2007.10) |
| B60K 6/48 | (2007.10) |
| F16H 37/04 | (2006.01) |
| B60K 6/54 | (2007.10) |

(52) U.S. Cl.
CPC ............... *B60W 20/30* (2013.01); *B60K 6/383* (2013.01); *B60K 6/387* (2013.01); *B60K 6/48* (2013.01); *B60K 2006/4808* (2013.01); *B60K 2006/4825* (2013.01); *B60K 2006/4841* (2013.01); *F16H 2037/045* (2013.01); *Y10S 903/902* (2013.01); *Y02T 10/6221* (2013.01); *Y02T 10/6252* (2013.01); *Y02T 10/626* (2013.01); *B60K 2006/541* (2013.01); *F16H 2200/006* (2013.01)

USPC .............................................. 477/5; 903/902

(58) Field of Classification Search
USPC ............ 477/5; 903/915, 917, 919; 180/65.22
See application file for complete search history.

(56) References Cited

U.S. PATENT DOCUMENTS

| | | | |
|---|---|---|---|
| 2005/0101432 A1 * | 5/2005 | Pels et al. ........................... | 477/5 |
| 2008/0280726 A1 * | 11/2008 | Holmes et al. .................... | 477/5 |

(Continued)

FOREIGN PATENT DOCUMENTS

| | | |
|---|---|---|
| DE | 102008031456 A1 | 1/2010 |
| EP | 2447571 A1 | 5/2012 |
| EP | 2468553 A1 | 6/2012 |

OTHER PUBLICATIONS

"Italian Application Serial No. BO20120363, Search Report mailed Feb. 18, 2013", 7 pgs.

*Primary Examiner* — Edwin A Young
(74) *Attorney, Agent, or Firm* — Schwegman Lundberg & Woessner, P.A.

(57) ABSTRACT

Examples include an automatic manual transmission for a hybrid car provided with an internal combustion engine and an electrical machine, the automatic manual transmission presents. Examples include a mechanical gearbox, a differential gear which receives the motion from a secondary shaft of the gearbox and transmits the motion to driving wheels, a clutch which is interposed between the secondary shaft of the gearbox and the differential gear, an auxiliary shaft along which the electrical machine is mounted, a first gear train which connects a first end of the auxiliary shaft arranged upstream of the electrical machine to a primary shaft of the gearbox, and a second gear train which connects a second end of the auxiliary shaft arranged downstream of the electrical machine to an output shaft of the clutch.

15 Claims, 21 Drawing Sheets

(56) References Cited

U.S. PATENT DOCUMENTS

| | | | |
|---|---|---|---|
| 2011/0083916 A1* | 4/2011 | Cimatti et al. | 180/65.22 |
| 2011/0167956 A1 | 7/2011 | Holmes | |
| 2011/0184599 A1* | 7/2011 | Cimatti et al. | 701/22 |
| 2012/0270697 A1* | 10/2012 | Takami et al. | 477/5 |

\* cited by examiner

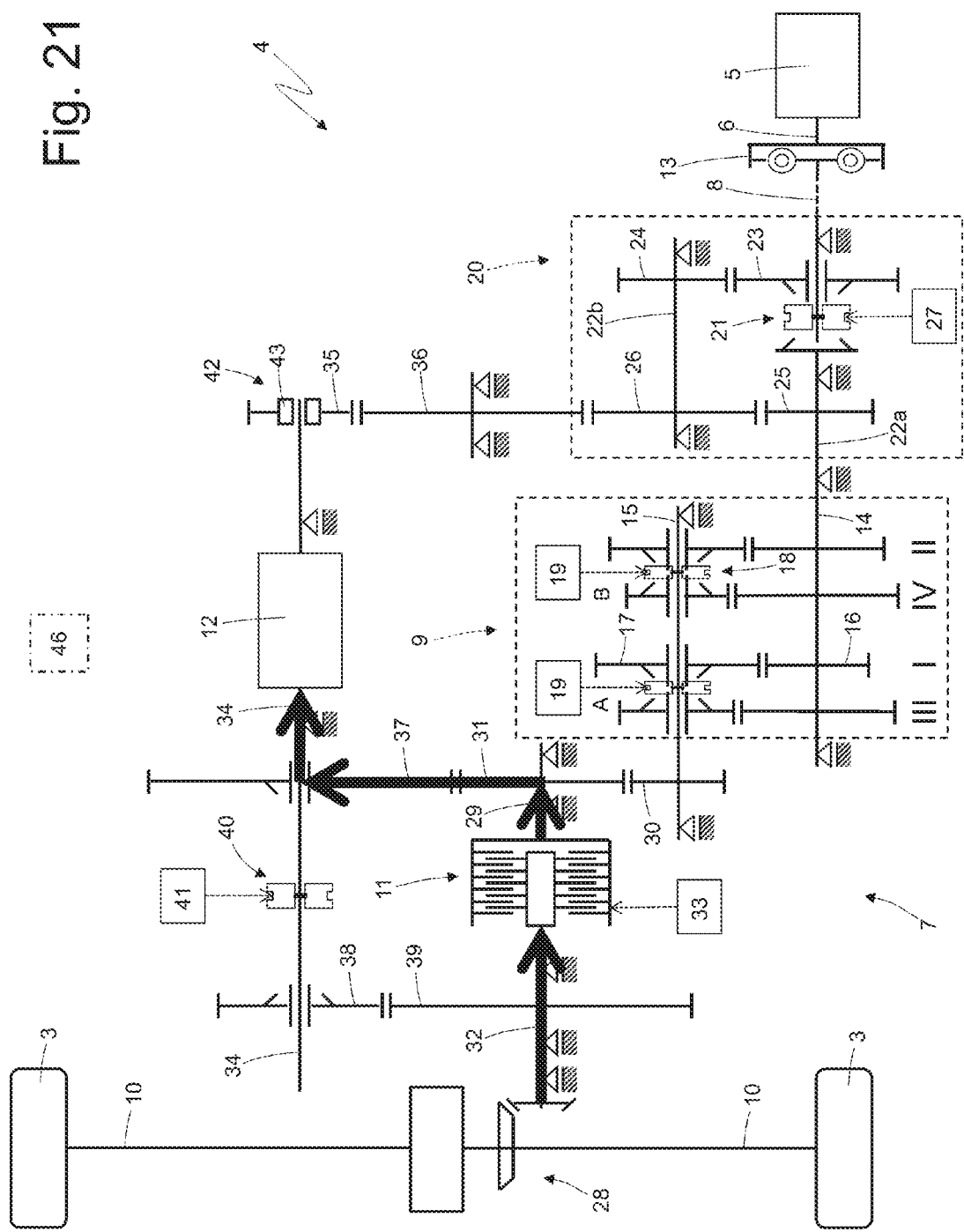

AUTOMATIC MANUAL TRANSMISSION FOR A HYBRID CAR PROVIDED WITH AN INTERNAL COMBUSTION ENGINE AND WITH AN ELECTRICAL MACHINE

PRIORITY CLAIM AND RELATED APPLICATIONS

This application claims the benefit of priority under 35 U.S.C. Section 119 to Italian Patent Application Serial No. BO2012A 000363, filed Jun. 3, 2012, which application is incorporated herein by reference in its entirety

TECHNICAL FIELD

The present invention relates to an automatic manual transmission for a hybrid car provided with an internal combustion engine and with an electrical machine.

BACKGROUND

In patent Application IT2012BO00316 an automatic manual transmission for a car provided with an internal combustion engine has been proposed. The automatic manual transmission comprises a mechanical gearbox provided with a primary shaft, a secondary shaft, a plurality of pairs of gears, and a plurality of servo-assisted locking devices activated by first actuators. Moreover, the automatic manual transmission comprises a servo-assisted drive device with a variable gear ratio, which is interposed between a drive shaft originating from the internal combustion engine and the primary shaft and can be adjusted so as to present two different gear ratios: a first even direct drive gear ratio and a second increased gear ratio. Finally, the automatic manual transmission comprises a second actuator, which is coupled to the drive device, so as to vary the gear ratio of the drive device. To change gears, a control unit controls, in a coordinated manner, the first actuators and the second actuator so as to combine a gear ratio of the drive device with a gear ratio of the gearbox to obtain a corresponding gear.

In the automatic manual transmission described in Patent Application IT2012BO00316, there may be a need to mechanically connect an electrical machine to make the car hybrid; to this end, there is a need for the electrical machine to effectively perform different functions in an energetically efficient manner (mainly start the internal combustion engine, generate power when there is a need to recharge the storage system, apply torque to the driving wheels where there is a need for electric traction, and regenerative braking). To this end, it is worth noting that the electrical machine has very precise limitations, that it is not capable of running at all engine speeds (in particular, it may normally run very slowly, but not run very quickly), or of operating in an energetically efficient manner at all engine speeds, or of generating/absorbing high torques at all engine speeds.

Patent Application US2011167956 describes an automatic manual hybrid transmission. In a first embodiment, a single-clutch gearbox is provided and the shaft of the electrical machine is directly connected to the secondary shaft of the gearbox. In a second embodiment, a twin-clutch gearbox is provided, provided with one primary shaft and two secondary shafts and the shaft of the electrical machine can be connected to both the secondary shafts of the gearbox by means of one gear train.

SUMMARY

Examples provide an automatic manual transmission for a hybrid car provided with an internal combustion engine and with an electrical machine, the automatic manual transmission of which is exempt from the above-described drawbacks, is simple and affordable to implement, and in particular allows the electrical machine to effectively perform different functions in an energetically efficient manner.

According to the present subject matter, an automatic manual transmission is provided for a hybrid car provided with an internal combustion engine and an electrical machine, as claimed by the appended claims.

BRIEF DESCRIPTION OF THE DRAWINGS

The present invention shall now be described with reference to the accompanying drawings, which illustrate several non-limiting embodiment examples thereof, in which:

FIGS. 7-21 schematically show different operating modes of an electrical machine of the automatic manual transmission in FIG. 2.

DETAILED DESCRIPTION

Figure 1:
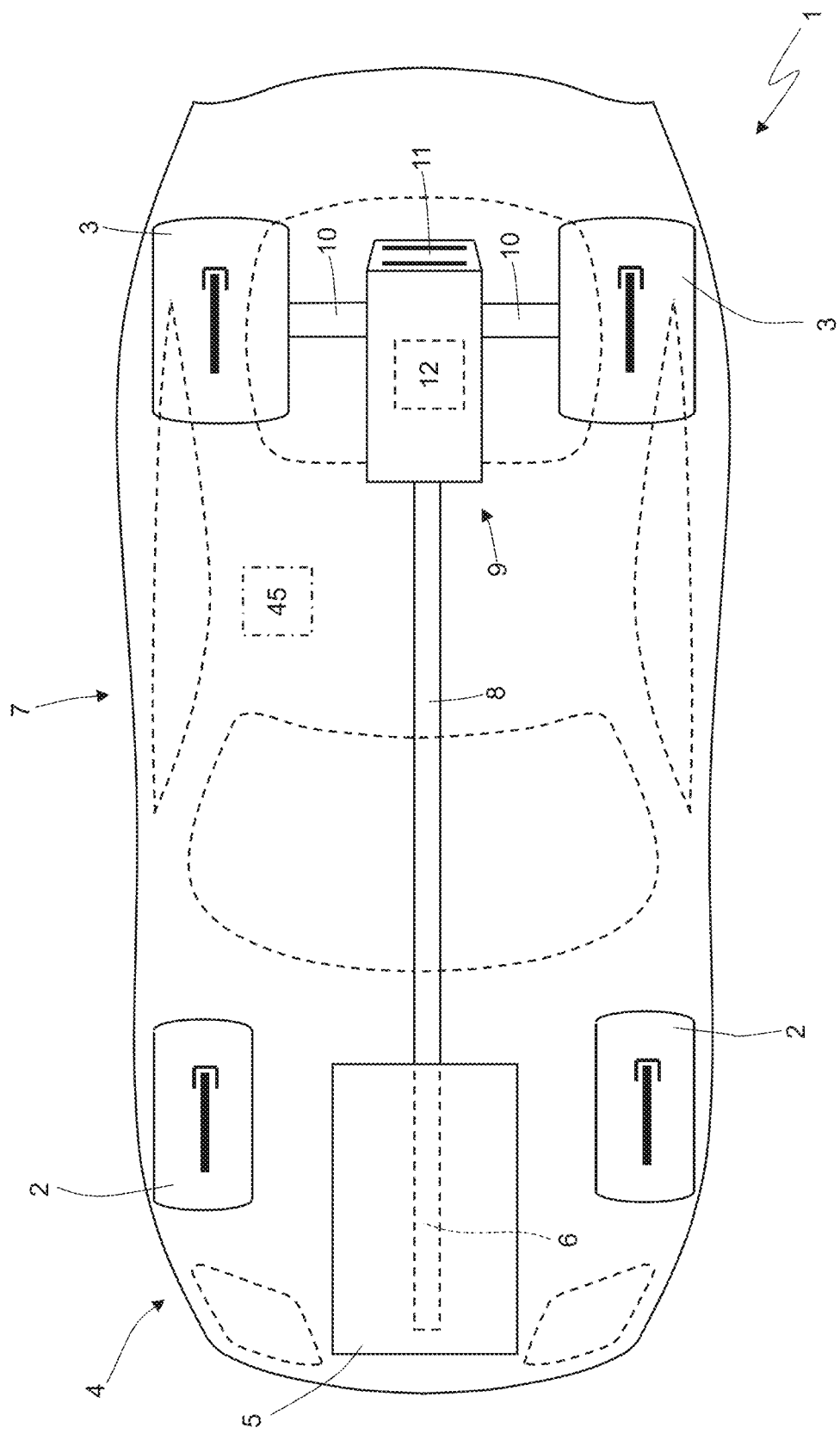
FIG. 1 is a schematic and top view of a hybrid car provided with an automatic manual transmission provided in accordance with the present subject matter.

Numeral 1 in FIG. 1 indicates a road vehicle as a whole, provided with two front wheels 2 and two rear driving wheels 3, which receive the torque from a motor propulsion system 4.

The motor propulsion system 4 comprises an internal combustion heat engine 5, which is arranged in front longitudinal position and is provided with a crankshaft 6, and an automatic manual transmission 7 (commonly called "AMT"), which transmits the torque generated by the internal combustion engine 5 to the rear driving wheels 3, and presents the configuration referred to as "transaxle". Transmission 7 comprises a drive shaft 8 which on the one hand is connected to the crankshaft 6 and on the other hand is mechanically connected to a gearbox 9, which is arranged in rear longitudinal position, and transmits the motion to the rear driving wheels 3 by means of two axle shafts 10. Gearbox 9 is also coupled to a clutch 11, which is also arranged in rear position and is housed in a bell fixed to the casing of gearbox 9.

As will be better described hereinafter, the motor propulsion system 4 comprises an electrical machine 12, which may be controlled to operate as a generator (by absorbing mechanical energy and supplying electric energy) or as an engine (by absorbing electric energy and supplying mechanical energy).

Figure 2:
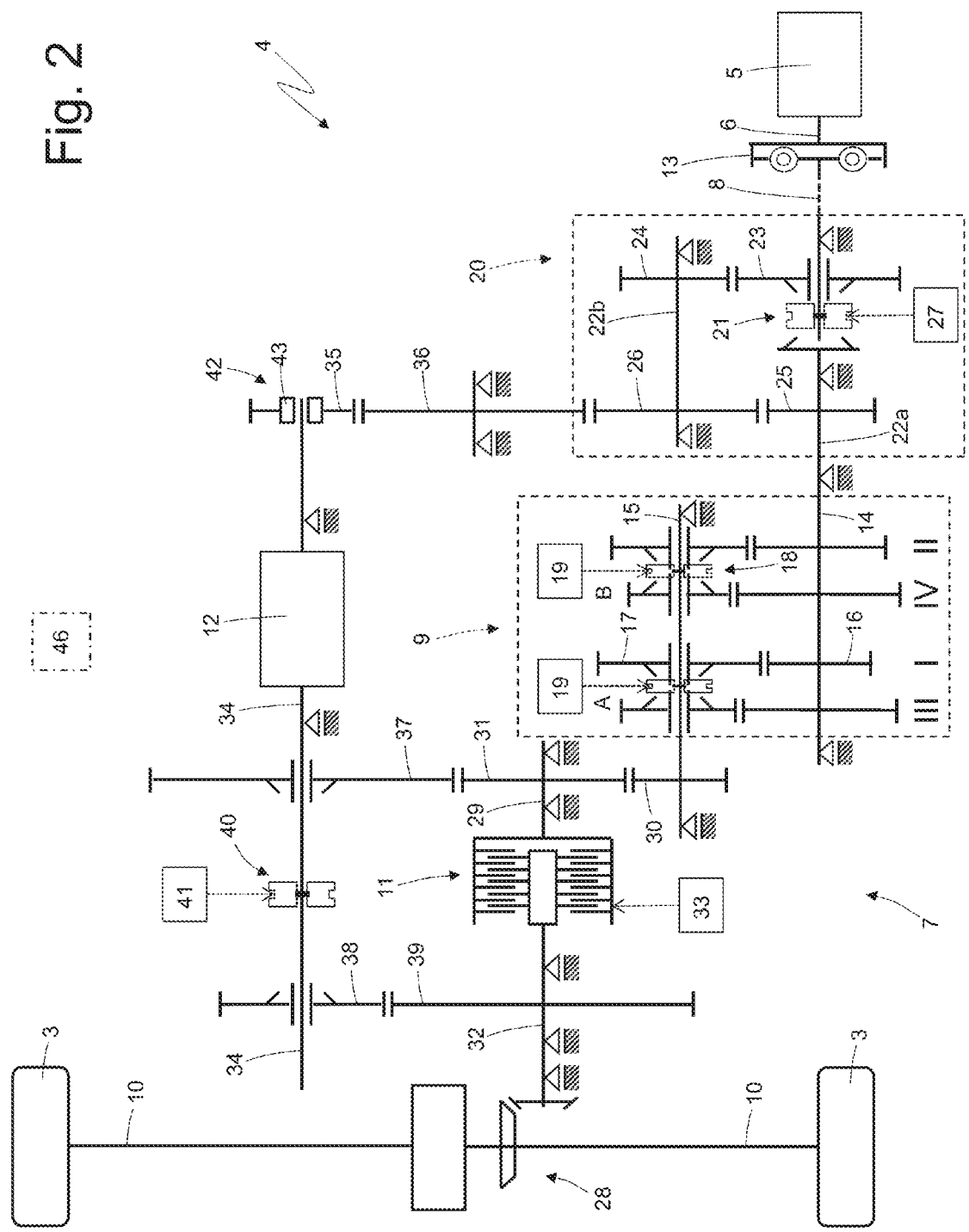
FIG. 2 is a schematic view of the automatic manual transmission in FIG. 1.

As shown in FIG. 2, the engine of the internal combustion engine 5 is provided with a flywheel 13 (typically a cushioned double flywheel) which is interposed between the crankshaft 6 and the drive shaft 8.

Gearbox 9 comprises a primary shaft 14, a secondary shaft 15, which is arranged parallel to and beside the primary shaft 14, and has a plurality of pairs (indicated with the Roman numerals I, II, III, IV) of gears 16 and 17, each of which has a corresponding gear ratio and comprises a primary gear 16, which is mounted rigidly on the primary shaft 14, and a secondary gear 17, which is mounted idle on the secondary shaft 15 and meshes, in a permanent manner, with the primary gear 16. Moreover, gearbox 9 comprises a pair of locking devices 18, each of which is mounted on the secondary shaft 15 and is suited to be actuated so as to alternatively lock two corresponding secondary gears 17 to the secondary shaft 15. According to an alternative (and perfectly equivalent) embodiment not illustrated, the primary gears 16 are mounted idle on the primary shaft 14, the secondary gears 17 are mounted rigidly on the secondary shaft 15, and the two servo-assisted locking devices 18 are mounted coaxial to the primary shaft 14 to lock, in an alternative manner, the corresponding primary gears 16 to the primary shaft 14.

Each locking device 18 is servo-assisted, i.e. is mechanically coupled to an actuator 19 (hydraulic or electric) which acts on the locking device 18 to move the locking device 18 between an intermediate idle position, in which the locking device 18 does not lock any secondary gear 17 to the secondary shaft 15, and two locking positions, in each of which the locking device 18 locks a corresponding secondary gear 17 to the secondary shaft 15.

The automatic manual transmission 7 comprises a drive device 20 with a variable gear ratio, which can be adjusted so as to present two different gear ratios and is interposed between the drive shaft 8 and the primary shaft 14; in other words, an input of the drive device 20 is integral to the drive shaft 8 (i.e. is rigidly restrained to the end of the drive shaft 8 opposite to the end which is integral to the flywheel 13), and an output of the drive device 20 is integral to the primary shaft 14 (i.e. is rigidly restrained to one end of the primary shaft 14). The drive device 20 can be adjusted to present an even gear ratio (i.e. a 1:1 gear ratio by means of which the primary shaft 14 presents the same angular speed of the drive shaft 8) obtained by means of direct drive; moreover, the drive device 20 can be adjusted to present an increased gear ratio (i.e. a gear ratio greater than 1:1 by means of which the primary shaft 14 rotates faster than the drive shaft 8).

The drive device 20 comprises a locking device 21 which is suited to be actuated so as to alternatively engage two different paths for the motion: a direct drive path (gear ratio 1:1) and an increased path (gear ratio greater than 1:1); the two paths extend by means of two parallel shafts 22a and 22b, which are connected to each other upstream of and downstream of the locking device 21 through two corresponding pairs of gears (moreover, shaft 22a is integral to the primary shaft 14 of gearbox 9). The pair of gears arranged upstream of the locking device 21 comprises a gear wheel 23 which is mounted idle on the drive shaft 8 and is locked to the drive shaft 8 by the locking device 21 and a gear wheel 24 which is integral to shaft 22b and meshes with the gear wheel 23; the pair of gears arranged downstream of the locking device 21 comprises a gear wheel 25 which is integral to shaft 22a and a gear wheel 26 which is integral to shaft 22b and meshes with the gear wheel 25. In the two locking positions, the locking device 21 alternatively locks the gear wheel 23 to the drive shaft 8 or locks the drive shaft 8 in direct drive to shaft 22a.

The drive device 20 is servo-assisted, i.e. is mechanically coupled to an actuator 27 (hydraulic or electric) which acts on the locking device 21 to alternatively select the even gear ratio (with which the primary shaft 14 presents the same angular speed as the drive shaft 8) or the increased gear ratio (with which the primary shaft 14 rotates faster than the drive shaft 8).

Clutch 11 is arranged downstream of gearbox 9 and is interposed between the secondary shaft 15 of gearbox 9 and a differential gear 28 to which the axle shafts 10 are directly connected. Clutch 11 presents an input shaft 29 which is connected to the secondary shaft 15 of gearbox 9 through a pair of gears; in particular, one gear wheel 30 is integral to the secondary shaft 15 and one gear wheel 31 is integral to the input shaft 29 and meshes with the gear wheel 30. Moreover, clutch 11 presents an output shaft 32 which is directly connected to the differential gear 28. Clutch 11 is servo-assisted, i.e. is mechanically coupled to an actuator 33 (hydraulic or electric) which acts on clutch 11 to move clutch 11 between an open position (in which clutch 11 separates the input shaft 29 from the output shaft 32 and therefore separates the secondary shaft 15 of gearbox 9 from the rear driving wheels 3) and a closed position (in which clutch 11 connects the input shaft 29 and the output shaft 32 to each other and therefore connects the secondary shaft 15 of gearbox 9 and the rear driving wheels 3 to each other). In other words, the servo-assisted clutch 11 can be opened to interrupt the mechanical connection between the input shaft 29 and the output shaft 32 and therefore to interrupt the mechanical connection between the secondary shaft 15 of gearbox 9 and the rear driving wheels 3.

The automatic manual transmission 7 comprises an auxiliary shaft 34, along which the electrical machine 12 is mounted; in other words, the auxiliary shaft 34 passes through the electrical machine 12 which is therefore crossed from side to side by the auxiliary shaft 34. It is worth noting that the auxiliary shaft 34 may be monolithic (that is made in one piece without joints) or may consist of several components joined to each other at a head.

One end of the auxiliary shaft 34 arranged upstream of the electrical machine 12 is mechanically connected with the primary shaft 14 of gearbox 9 through a gear train, which comprises a gear wheel which is mechanically connected to the auxiliary shaft 34 and a gear wheel 36 which on one side meshes with the gear wheel 35 and on the other side meshes with the gear wheel 26 of the drive device 20; as previously mentioned, the gear wheel 26 of the drive device 20 meshes with the gear wheel 27 of the drive device 20 which is angularly integral to the primary shaft 14 of gearbox 9.

One end of the auxiliary shaft 34 arranged downstream of the electrical machine 12 can be connected alternatively to the input shaft 29 of clutch 11 (which is angularly integral to the secondary shaft 15 of gearbox 9) or to the output shaft 32 of clutch 11 (which is angularly integral to the differential gear 28).

The end of the auxiliary shaft 34 arranged downstream of the electrical machine 12 is provided with a gear wheel 37, which is mounted idle on the auxiliary shaft 34 and meshes with the gear wheel 31 which, in turn, is splined to the input shaft 29 of clutch 11 and is angularly integral to the secondary shaft 15 of gearbox 9 thus meshing with the gear wheel 30. Moreover, the end of the auxiliary shaft 34 arranged downstream of the electrical machine 12 is provided with a gear wheel 38, which is mounted idle on the auxiliary shaft 34 and meshes with the gear wheel 39 which is integral to the output shaft 32 of clutch 11. A locking device 40 is provided, which is mounted on the auxiliary shaft 34 and is suited to be actuated so as to alternatively lock the two gear wheels 37 and 38 to the auxiliary shaft 34. The locking device 40 is servo-assisted, i.e. is mechanically coupled to an actuator 41 (hydraulic or electric) which acts on the locking device 40 to move the locking device 40 between an intermediate idle position, in which the locking device 40 does not lock any gear wheel 37 or 38 to the auxiliary shaft 34, and two locking positions, in each of which the locking device 40 locks a corresponding gear wheel 37 or 38 to the auxiliary shaft 34.

The end of the auxiliary shaft 34 arranged upstream of the electrical machine 12 is provided with a disconnecting device 42, which is suited to separate the auxiliary shaft 34 from the primary shaft 14 of gearbox 9 (or better, by separating the auxiliary shaft 34 from the gear train which connects the auxiliary shaft 34 to the primary shaft 14 of gearbox 9). In the embodiment shown in FIG. 2, the disconnecting device 42 is passive (i.e. it cannot be controlled) and comprises a freewheel 43 (or idle wheel 43) which transmits the motion (i.e. meshes) when it rotates in a certain rotating direction and does not transmit the motion (i.e. it does not mesh) when it rotates in the opposite rotating direction. Moreover, freewheel 43 presents the centrifugal disconnection which allows the transmission of the motion (i.e. allows meshing) only when the rotation speed is lower than a predetermined maximum rotation speed. In the embodiment shown in FIG. 3, the disconnecting device 42 is active (i.e. can be controlled) and comprises a clutch 44 which may be opened and closed when wanted. Clutch 44 is servo-assisted, i.e. is mechanically coupled to an actuator 45 (hydraulic or electric) which acts on clutch 44 to move clutch 44 between an open position (in which clutch 44 separates the auxiliary shaft 34 from the gear wheel 35) and a closed position (in which clutch 44 connects the auxiliary shaft 34 and the gear wheel 35 to each other).

The function of the disconnecting device 42 is to mechanically disconnect the electrical machine 12 from the primary shaft 14 of gearbox 9 (and therefore also from crankshaft 6 of the internal combustion engine 5) in certain operating modes and/or when the electrical machine 12 reaches rotation speeds which are too high (i.e. cannot be mechanically supported by the electrical machine 12 especially for long periods).

Finally, the automatic manual transmission 7 comprises an electronic control unit 46 ("ECU") which monitors the operation of the automatic manual transmission and, among other things, changes gears by controlling the actuators 19, 27 and 33 in a coordinated and completely "transparent" manner for the driver (i.e. the driver sends only one request to change gears without any type of direct control over which actuators 19, 27 and 33 are actually used to change gears). Moreover, the control unit 46 controls the electrical machine 12 to determine when and how the electrical machine 12 is to operate (i.e. whether or not as an engine or as a generator) and simultaneously controls the actuators 40 and 45 (when provided) to determine the mode for mechanically connecting the electrical machine 12.

The second increased gear ratio of the drive device 20 (the first gear ratio is always a direct drive) and the gear ratios of the pairs I, II, III, IV of gears 16 and 17 of gearbox 9 present values that are such that all the gears that can be obtained by combining any gear ratio of the drive device 20 with any gear ratio of gearbox 9 present different gear ratios without overlaps (i.e. without generating identical or very similar gear ratios).

Figure 4:
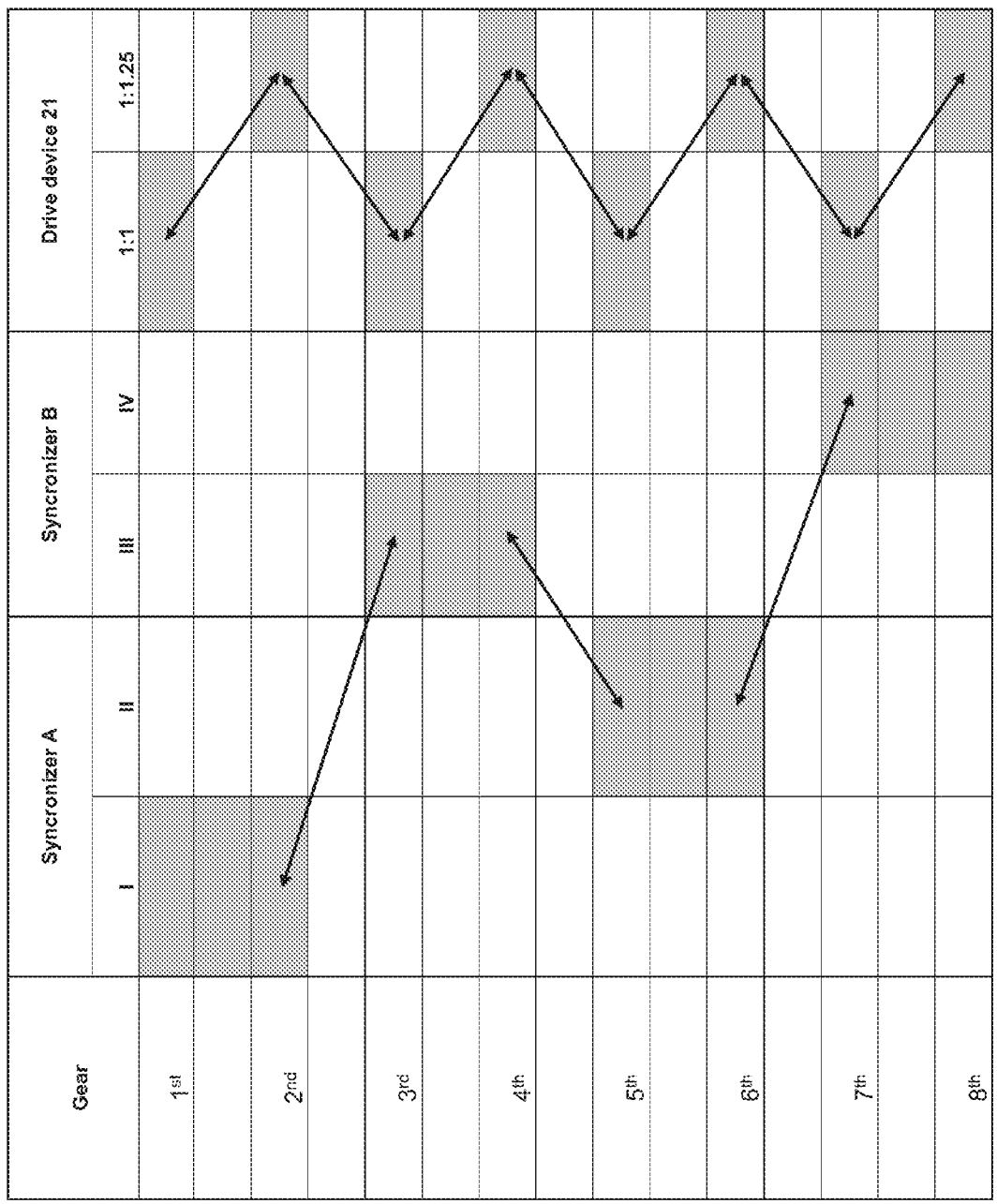
FIGS. 4-6 are three tables which illustrate corresponding methods for actuating three devices for selecting the automatic manual transmission in FIG. 2 to globally obtain eight different forward gears.

According to the embodiment schematically shown in FIG. 4, in order to perform, in sequence, all the upshifts from the shortest gear (i.e. the first gear—$1^{st}$ gear) to the longest gear (i.e. the eighth gear—$8^{th}$ gear), the control unit 46 activates, at each gear shift, actuator 27 so as to vary the gear ratio of the drive device 20, and activates in an alternate manner, i.e. at one gear shift not and at the following gear shift yes, the actuators 19 of the locking devices 18 so as to vary the engaged pair I, II, III, IV of gears 16 and 17.

Figure 5:
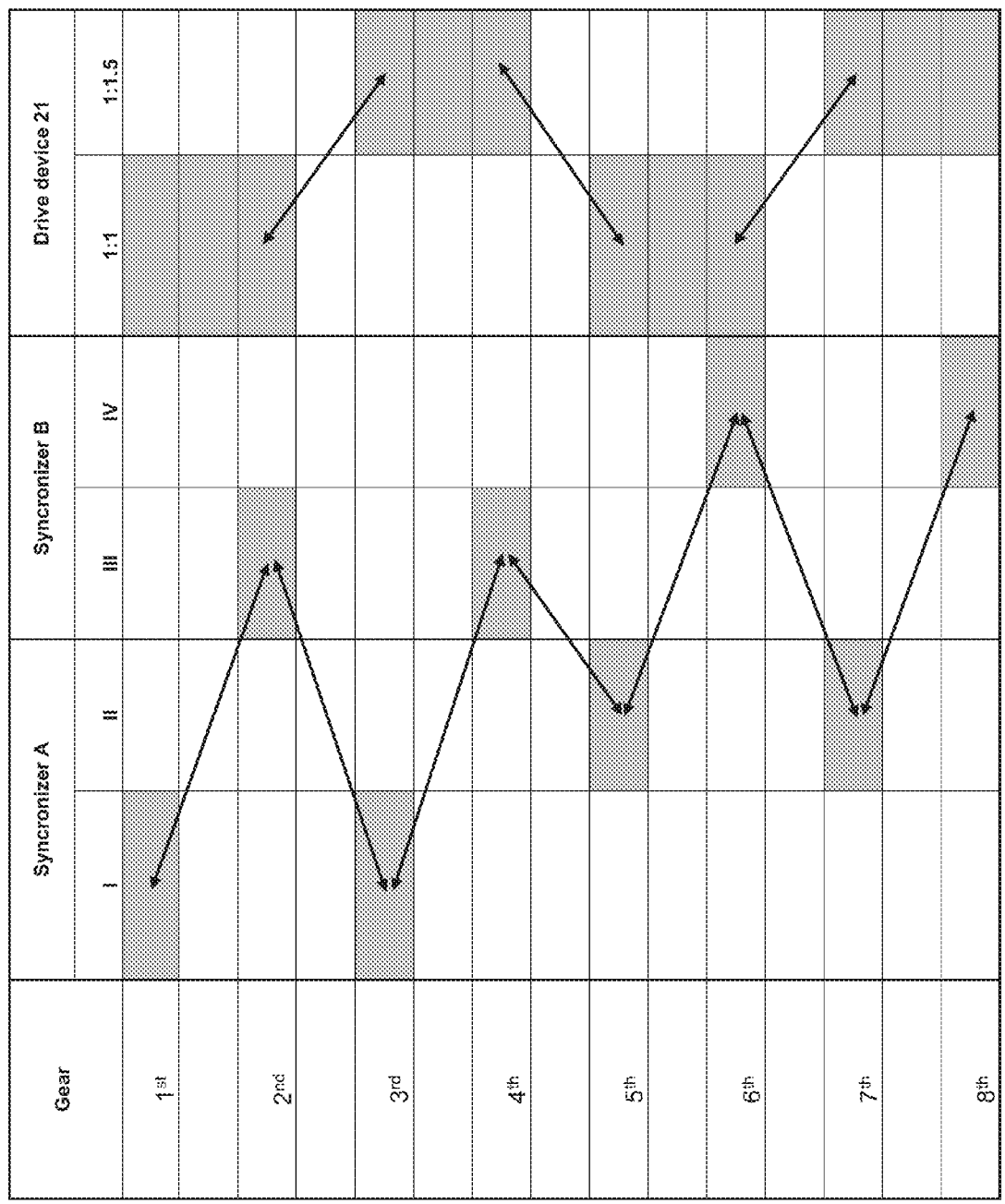

According to the embodiment schematically shown in FIG. 5, in order to perform, in sequence, all the upshifts from the shortest gear (i.e. the first gear—$1^{st}$ gear) to the longest gear (i.e. the eighth gear—$8^{th}$ gear), the control unit 46 activates, at each gear shift, the actuators 19 of the locking devices 18 so as to vary the engaged pair I, II, III, IV of gears 16 and 17 and activates in an alternate manner, i.e. at one gear shift not and at the following gear shift yes, actuator 27 so as to vary the gear ratio of the drive device 20.

Figure 6:
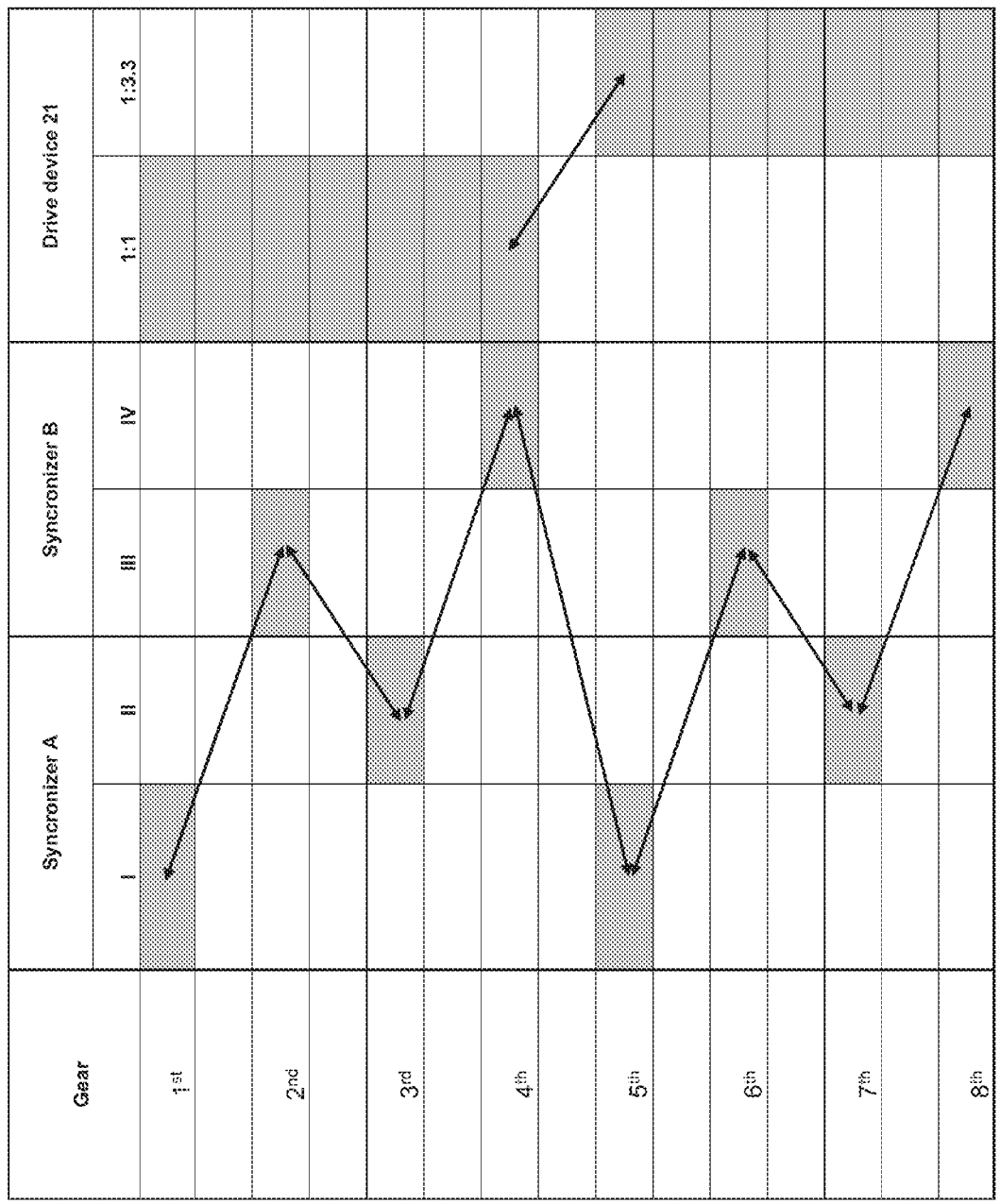

According to the embodiment schematically shown in FIG. 6, all the gears are divided into a lower group (comprising the four gears between the first gear—$1^{st}$ gear—and the fourth gear—$4^{th}$ gear) and an upper group (comprising the four gears between the fifth gear—$5^{th}$ gear—and the eighth gear—$8^{th}$ gear), so that the longest gear of the lower group (i.e. the fourth gear—$4^{th}$ gear) presents a shorter gear ratio with respect to the shortest gear of the upper group (i.e. the fifth gear—$5^{th}$ gear). In order to perform a gear shift within a same group (i.e. between two gears belonging to a same group), the control unit 46 exclusively activates the actuators 19 of the locking devices 18 (i.e. does not touch actuator 27), so as to vary the engaged pair I, II, III, IV of gears 16 and 17 that is engaged in gearbox 9. Instead, in order to perform a gear shift between a gear of the lower group and a gear of the upper group, the control unit 46 simultaneously activates the actuators 19 of the locking devices 18, so as to vary the engaged pair I, II, III, IV of gears 16 and 17 of gearbox 9, and actuator 27, so as to vary the gear ratio of the drive device 20.

Clearly, the control unit 46 controls actuator 33 to open clutch 11 before controlling actuator 27 to vary the gear ratio of the drive device 20 and/or the actuators 19 of the locking devices 18 to vary the engaged pair I, II, III, IV of gears 16 and 17; in the same way, the control unit 46 controls actuator 33 to close clutch 11 after controlling actuator 27 to vary the gear ratio of the drive device 20 and/or the actuators 19 of the locking devices 18 to vary the engaged pair I, II, III, IV of gears 16 and 17.

Figure 3:
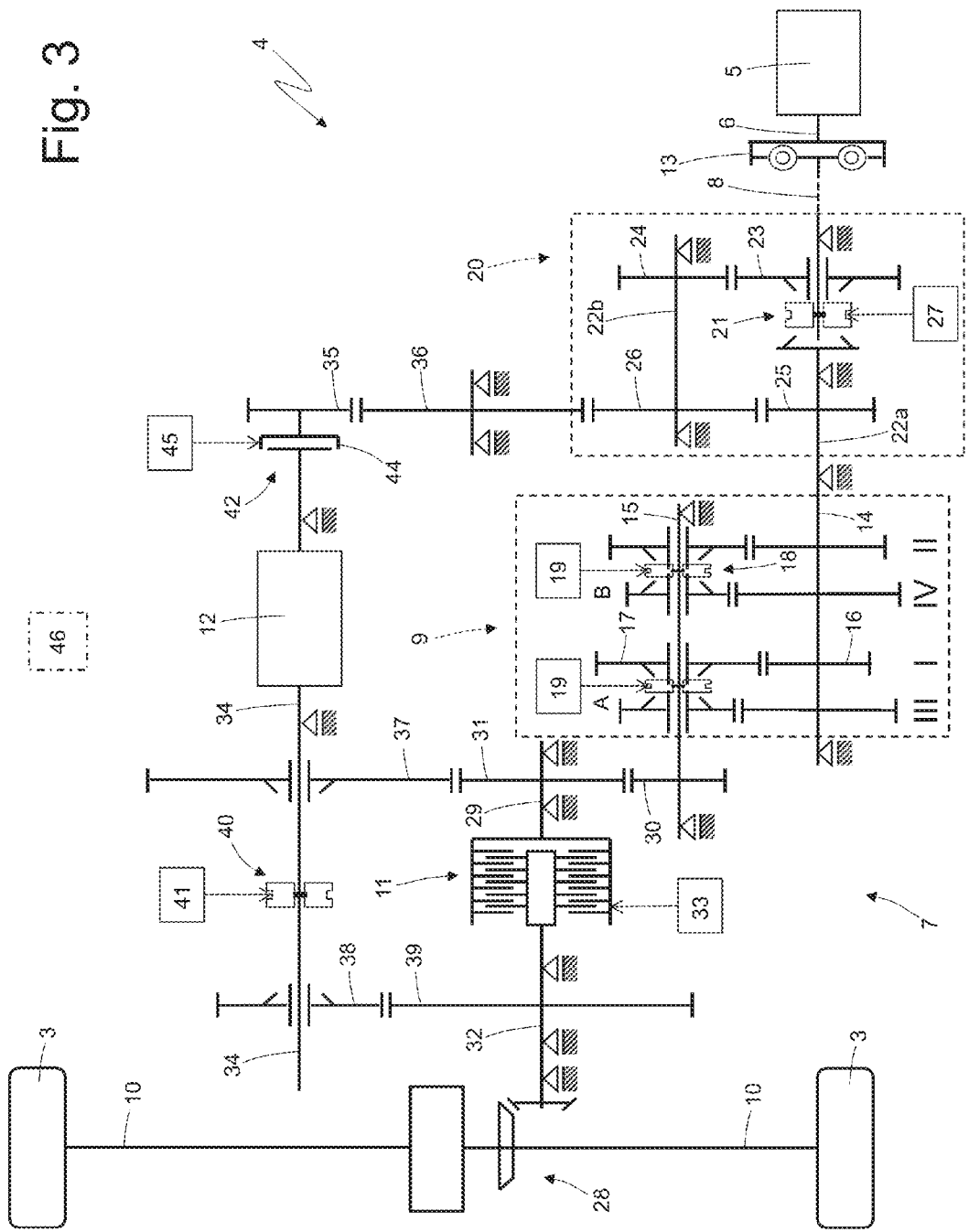
FIG. 3 is a schematic view of a construction variant of the automatic manual transmission in FIG. 1.

Described below are certain possible operating modes of the electrical machine 12 with reference to the embodiment illustrated in FIG. 2 (the operating modes are obviously also the same for the embodiment illustrated in FIG. 3). It is worth noting that certain operating modes of the electrical machine 12 are described below by way of example, and therefore it is also possible for other operating modes for the electrical machine 12 to exist, and/or that not all such operating modes of the electrical machine 12 are effectively used in practice.

Figure 7:
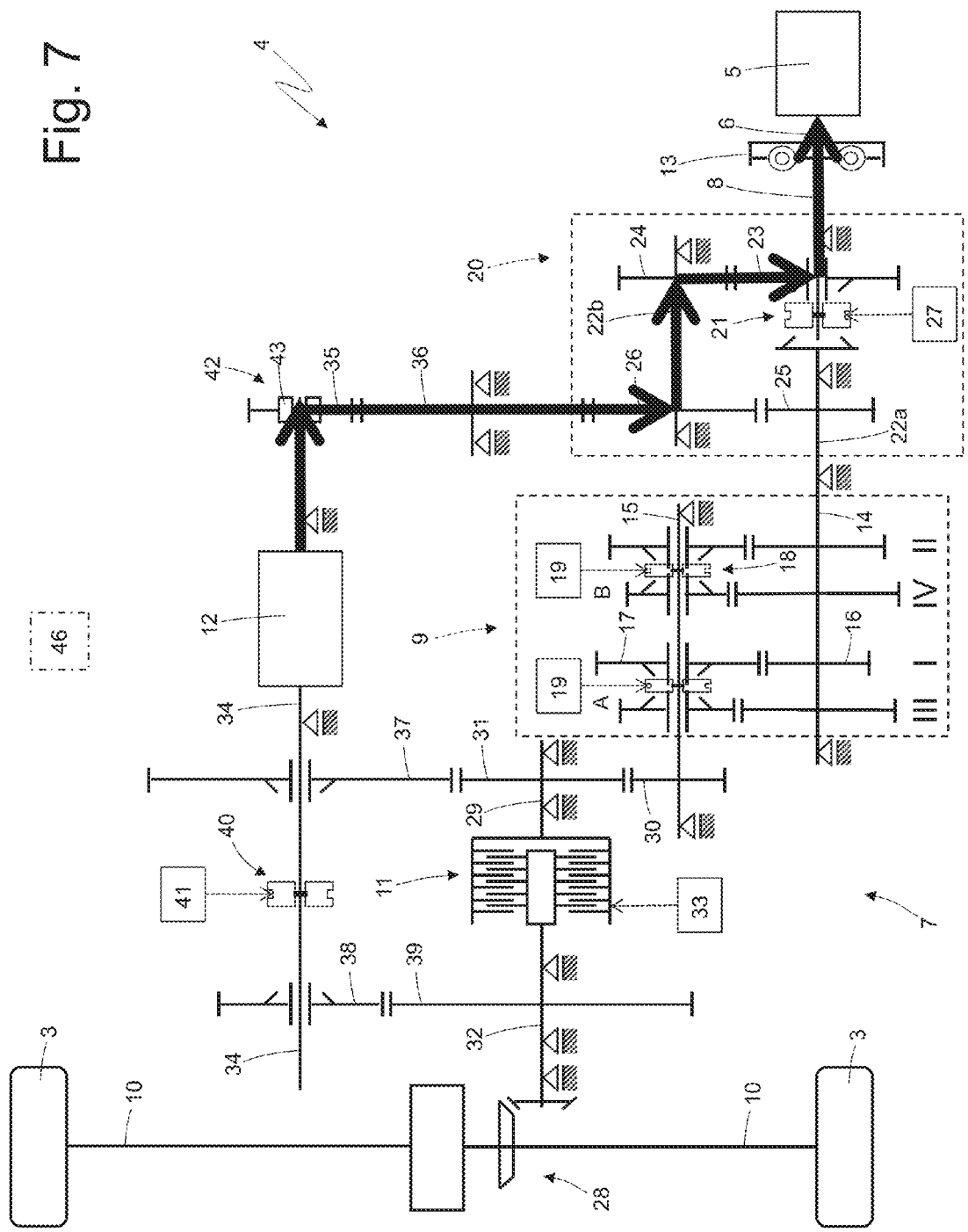

FIG. 7 illustrates a first starting mode of the internal combustion engine 5 using the torque developed by the electrical machine 12 which is caused to operate as an engine; in this first starting mode, the locking devices 18 and 40 are in the idle position, the locking device 21 locks the gear wheel 23 to the drive shaft 8 (alternatively, the locking device 21 could lock the drive shaft 8 to shaft 22a), and the idle wheel 43 meshes (that is transmits the motion).

Figure 8:
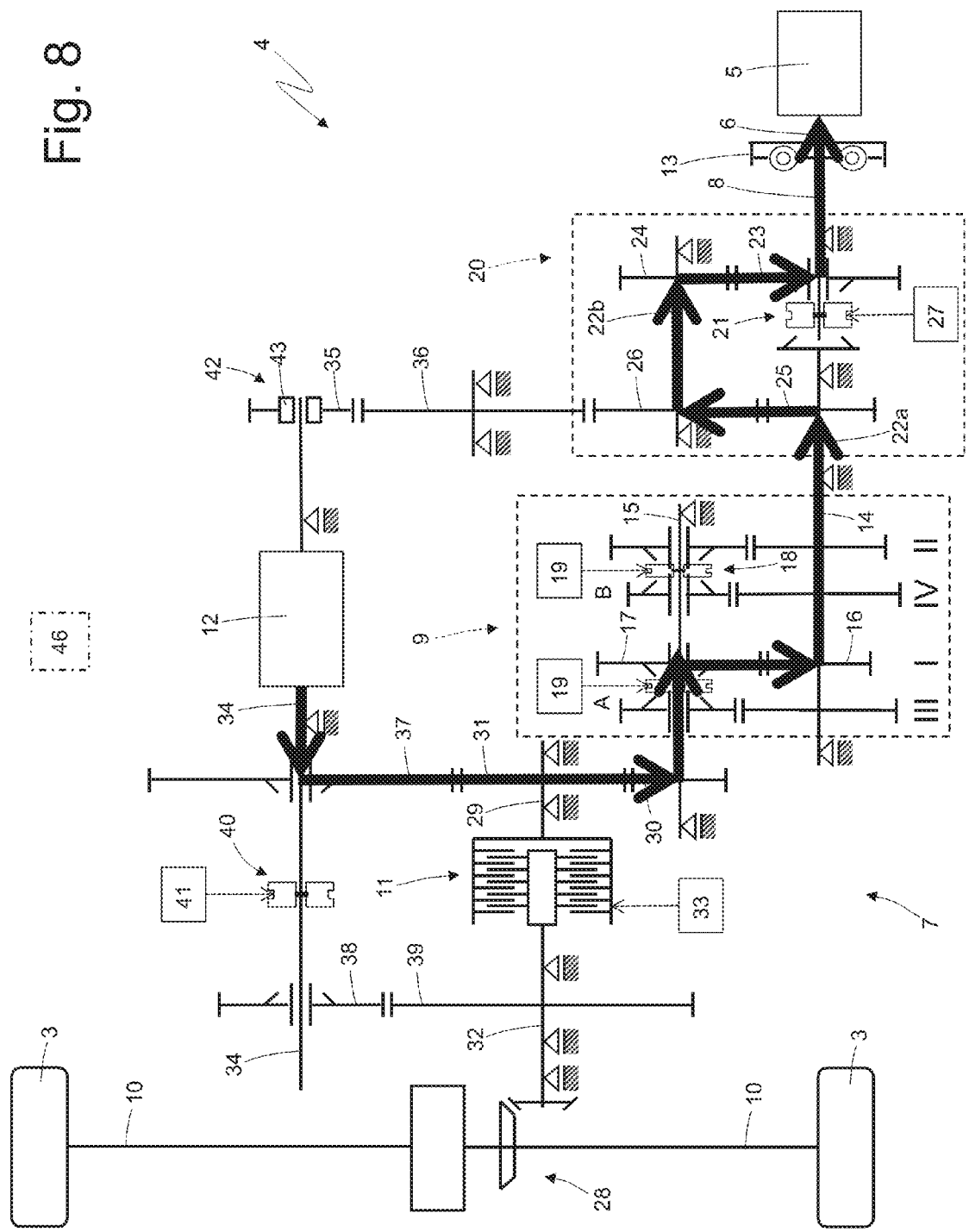

FIG. 8 illustrates a second starting mode of the internal combustion engine 5 using the torque developed by the electrical machine 12 which is caused to operate as an engine; in this second starting mode, the locking device 40 locks the gear wheel 37 to the auxiliary shaft 34, clutch 11 is open, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 9:
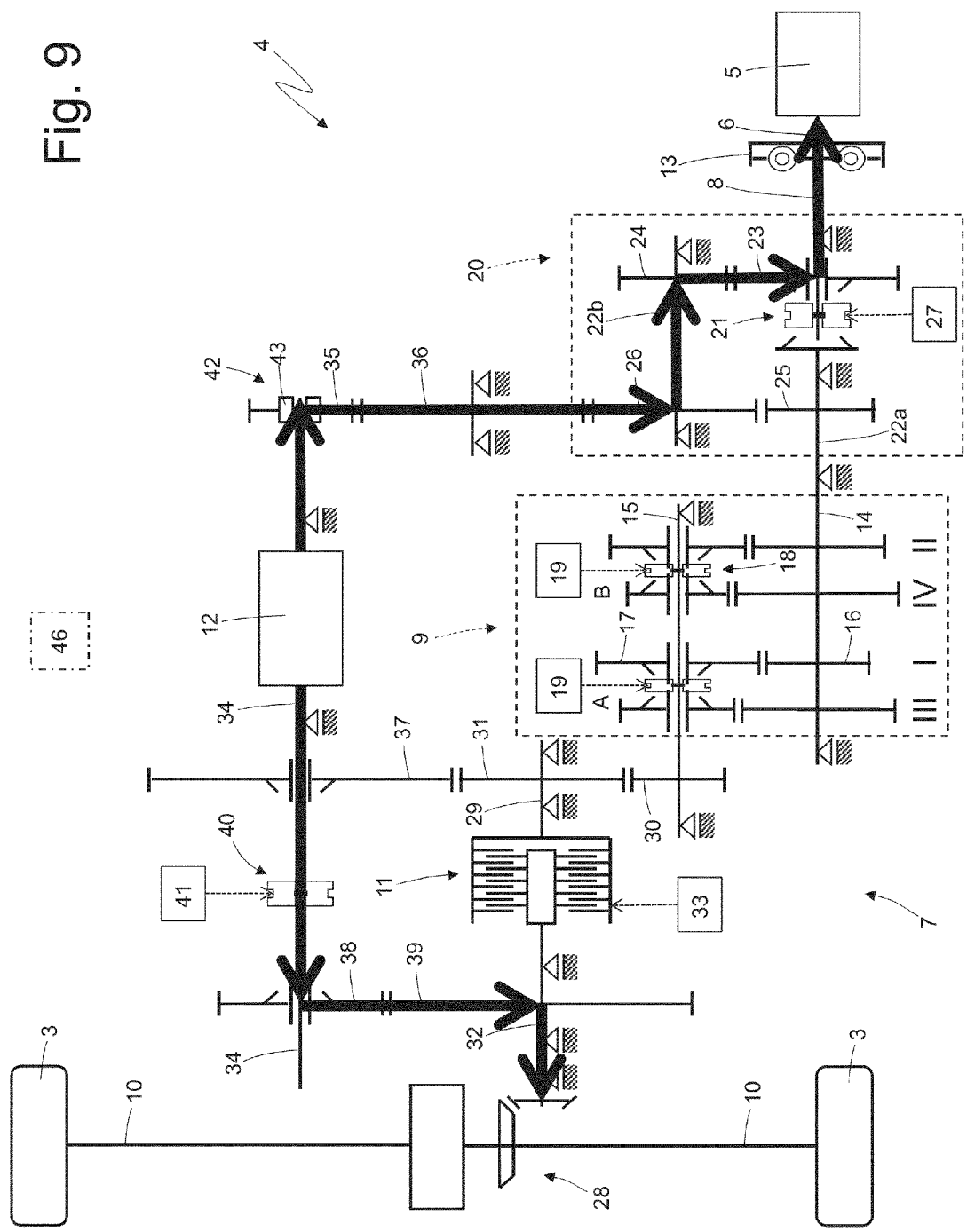

FIG. 9 illustrates a first launching mode which by using the torque developed by the electrical machine 12 which is caused to operate as an engine, simultaneously starts the internal combustion engine 5 and the movement of car 1; in this first launching mode, the locking device 40 locks the gear wheel 38 to the auxiliary shaft 34, clutch 11 is open, the locking devices 18 are in the idle position, the locking device 21 locks the gear wheel 23 to the drive shaft 8 (alternatively, the locking device 21 could lock the drive shaft 8 to shaft 22a), and the idle wheel 43 meshes (that is transmits the motion).

Figure 10:
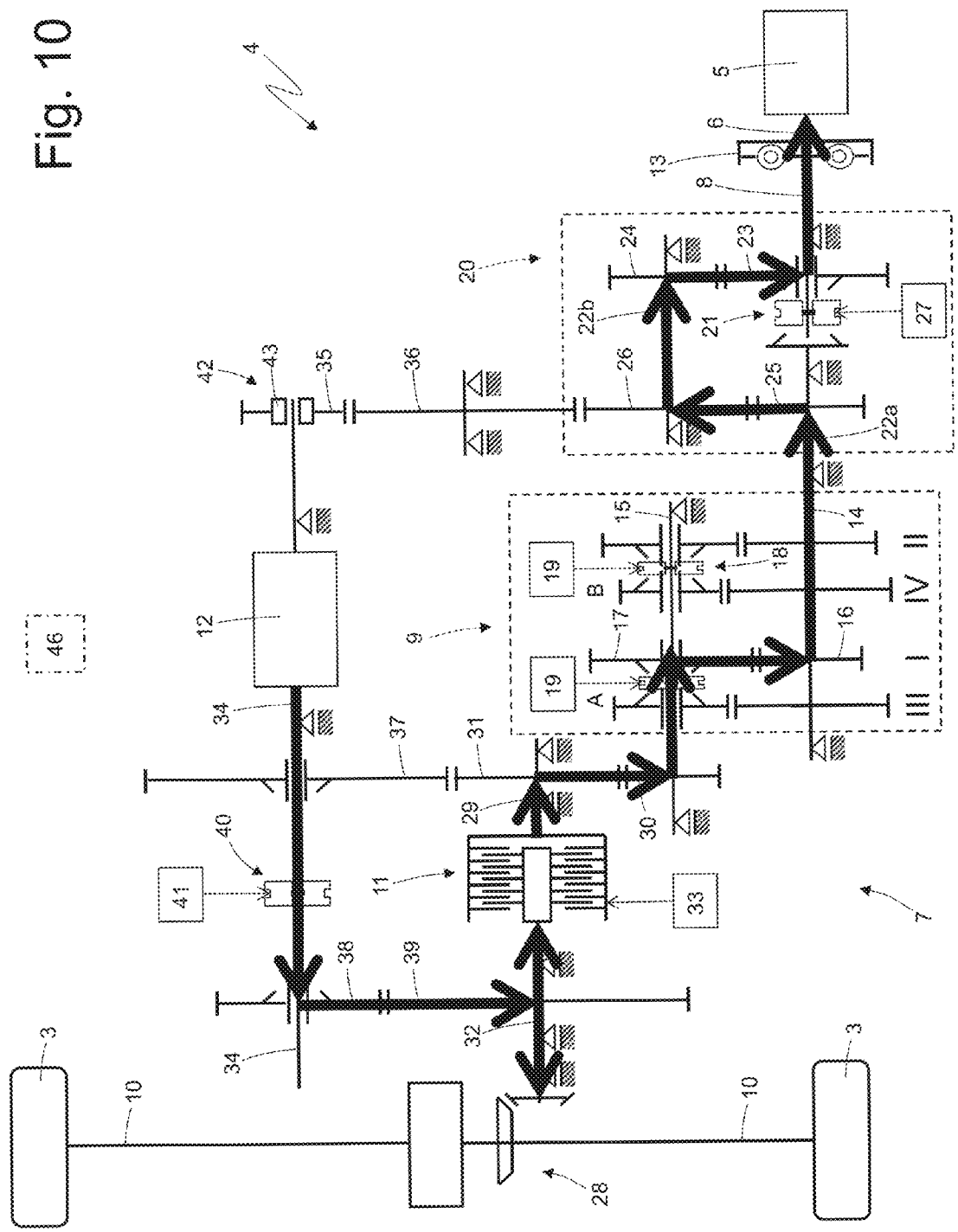

FIG. 10 illustrates a second launching mode which by using the torque developed by the electrical machine 12 which is caused to operate as an engine, simultaneously starts the internal combustion engine 5 and the movement of car 1; in this second launching mode, the locking device 40 locks the gear wheel 38 to the auxiliary shaft 34, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 11:
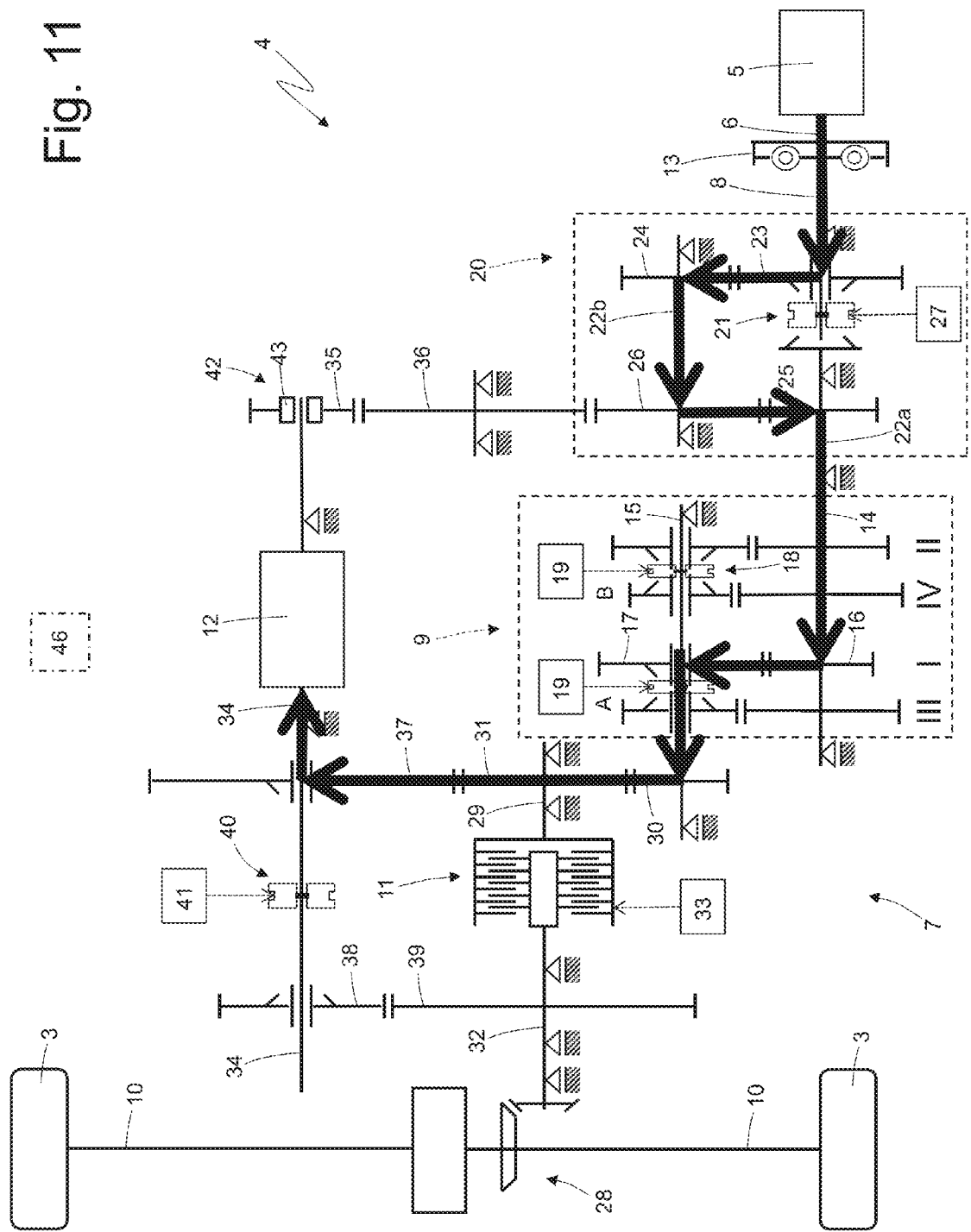

FIG. 11 illustrates a mode for recharging the system for storing electric energy when car 1 is stopped, by using the torque developed by the internal combustion engine 5 and causing the electrical machine 12 to operate as a generator; in this recharging mode, the locking device 40 locks the gear wheel 37 to the auxiliary shaft 34, clutch 11 is open, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 12:
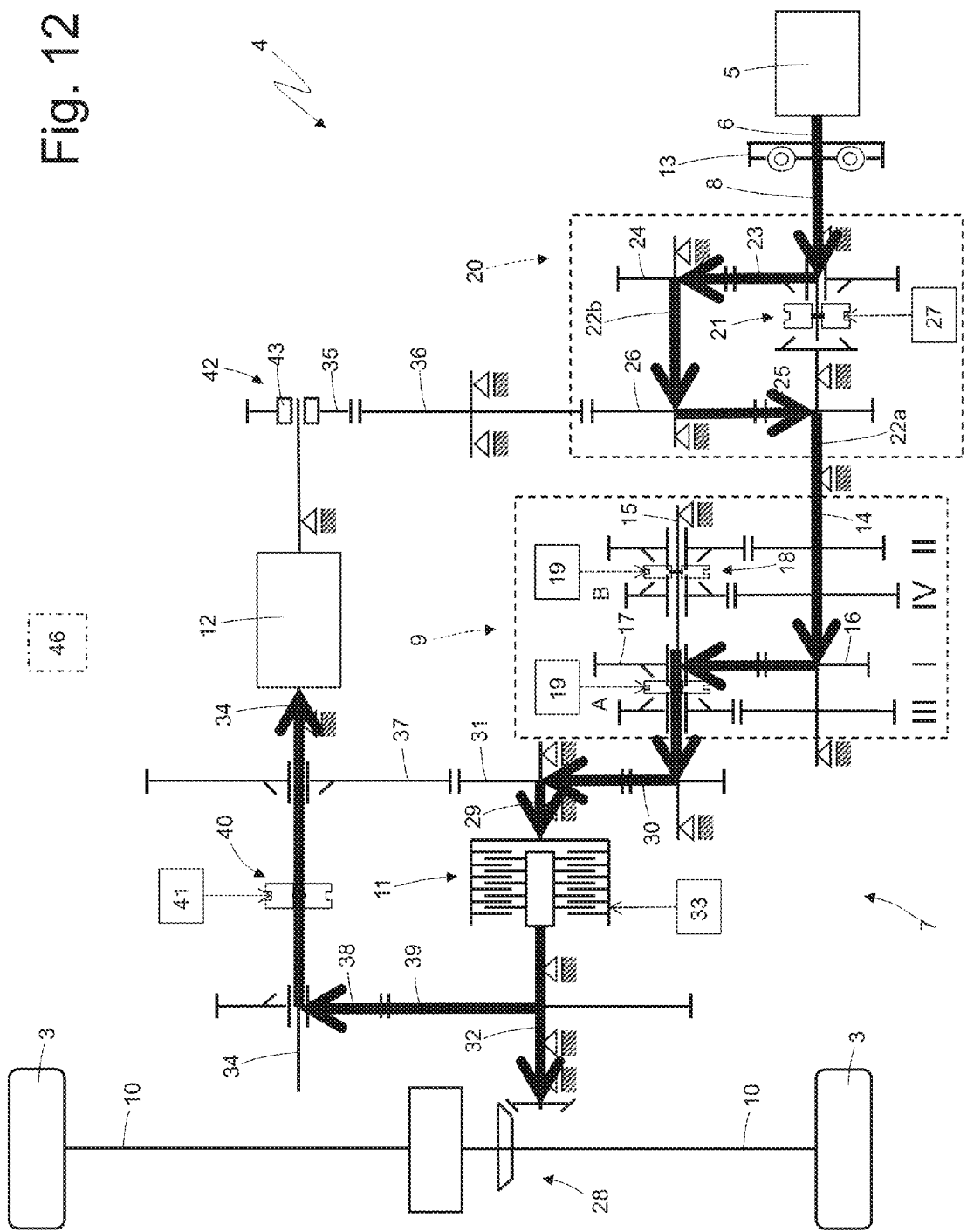

FIG. 12 illustrates a first mode for recharging the system for storing electric energy when car 1 is moving, by using the torque developed by the internal combustion engine 5 and causing the electrical machine 12 to operate as a generator; in this first recharging mode, the locking device 40 locks the gear wheel 38 to the auxiliary shaft 34, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 13:
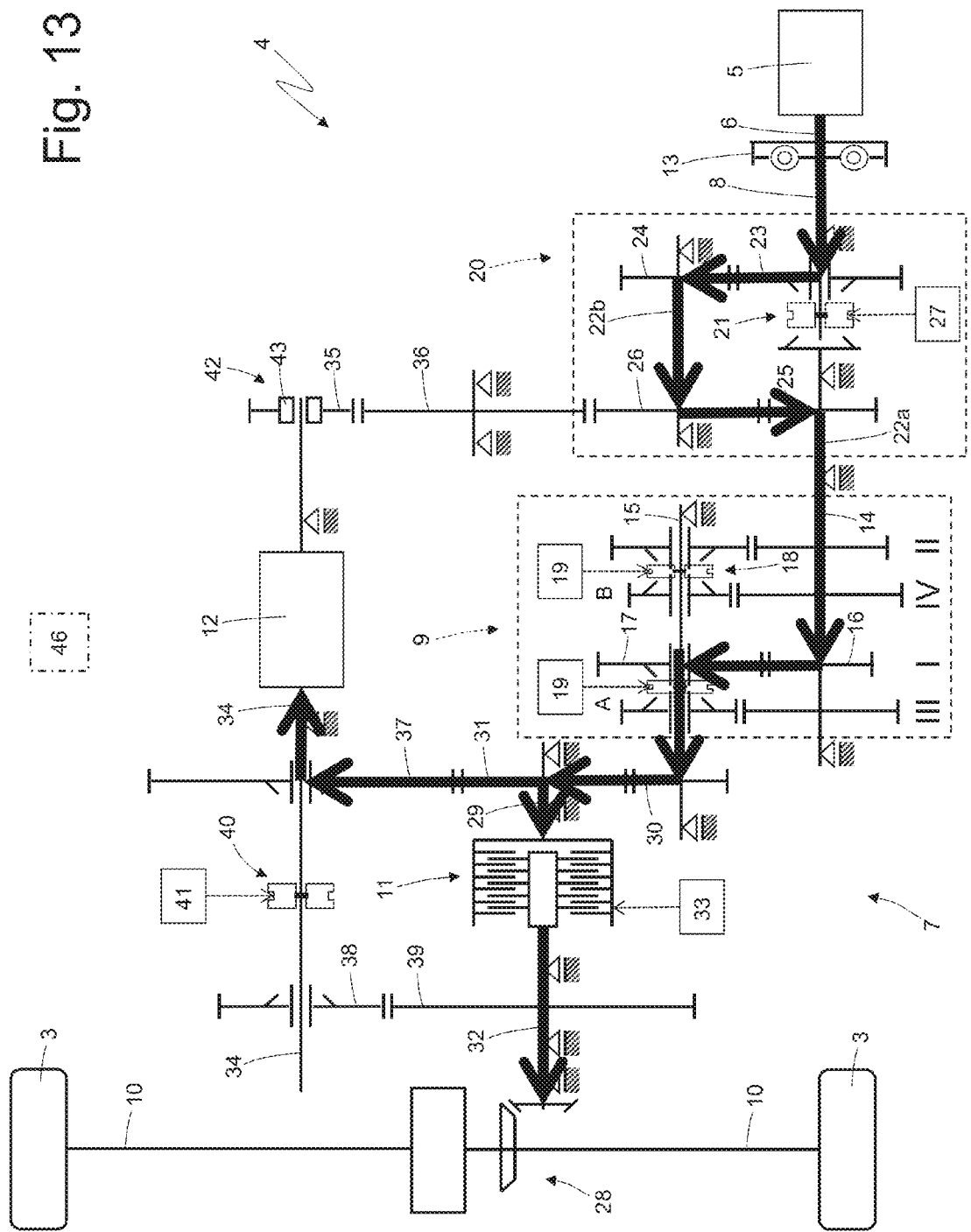

FIG. 13 illustrates a second mode for recharging the system for storing electric energy when car 1 is moving, by using the torque developed by the internal combustion engine 5 and causing the electrical machine 12 to operate as a generator; in this second recharging mode, the locking device 40 locks the gear wheel 37 to the auxiliary shaft 34, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 14:
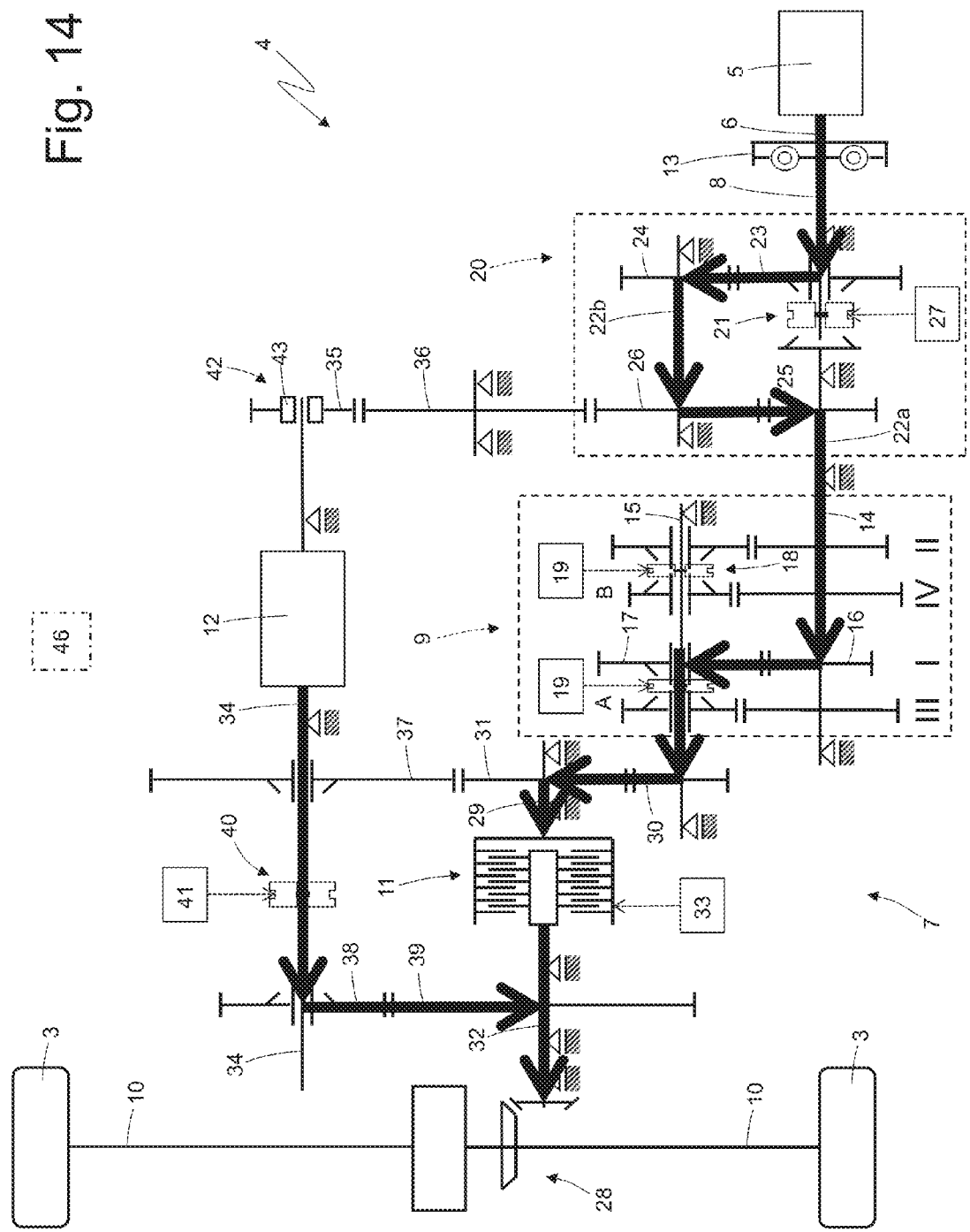

FIG. 14 illustrates a first combined-motion mode in which the torque applied to the rear driving wheels 3 originates in part from the internal combustion engine 5 and in part from the electrical machine 12 which operates as an engine; in this first combined-motion mode, the locking device 40 locks the gear wheel 38 to the auxiliary shaft 34, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 15:
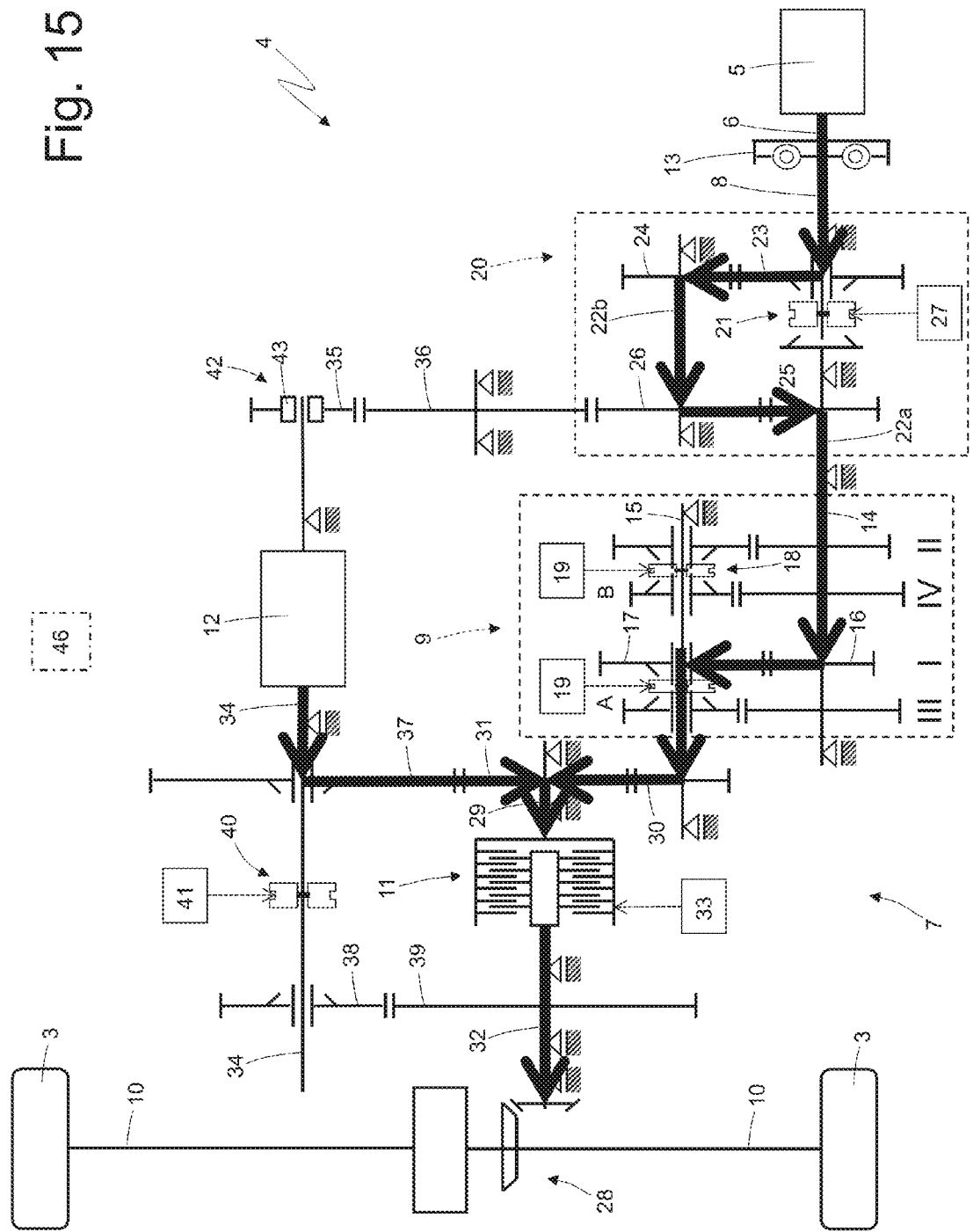

FIG. 15 illustrates a second combined-motion mode in which the torque applied to the rear driving wheels 3 originates in part from the internal combustion engine 5 and in part from the electrical machine 12 which operates as an engine; in this second combined-motion mode, the locking device 40 locks the gear wheel 37 to the auxiliary shaft 34, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 16:
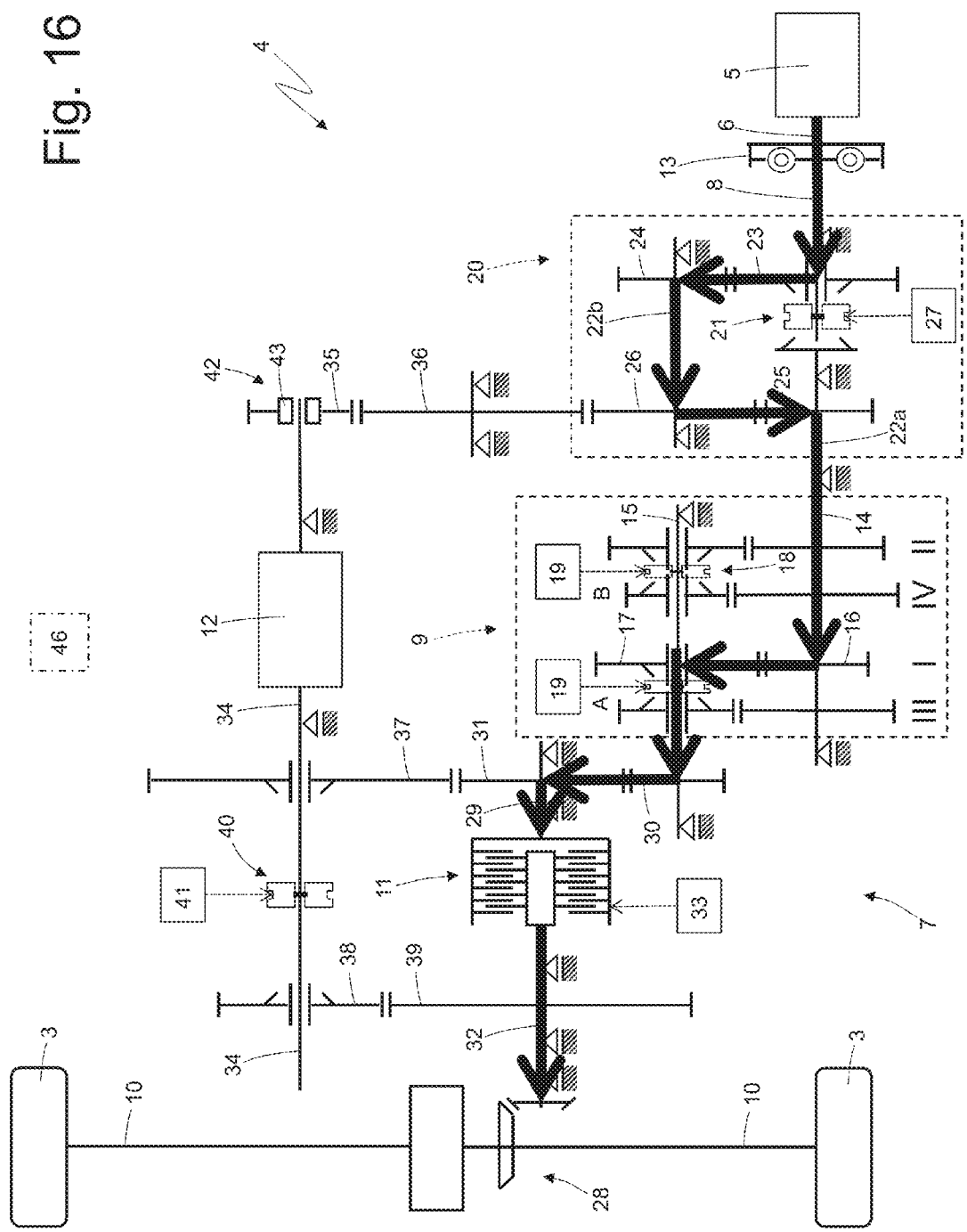

FIG. 16 illustrates a mode of purely thermal motion in which the torque applied to the rear driving wheels 3 originates exclusively from the internal combustion engine 5 and the electrical machine 12 is switched off (disabled); in this mode of purely thermal motion, the locking device 40 is in idle position, clutch 11 is closed, the locking device 18 engages (for example) pair I of gears of gearbox 9 (obviously another pair of gears could be used), the locking device 21 locks the gear wheel 23 to the drive shaft 8 (alternatively, the locking device 21 could lock the drive shaft 8 to shaft 22a), and the freewheel 43 does not mesh (that is does not transmit the motion).

Figure 17:
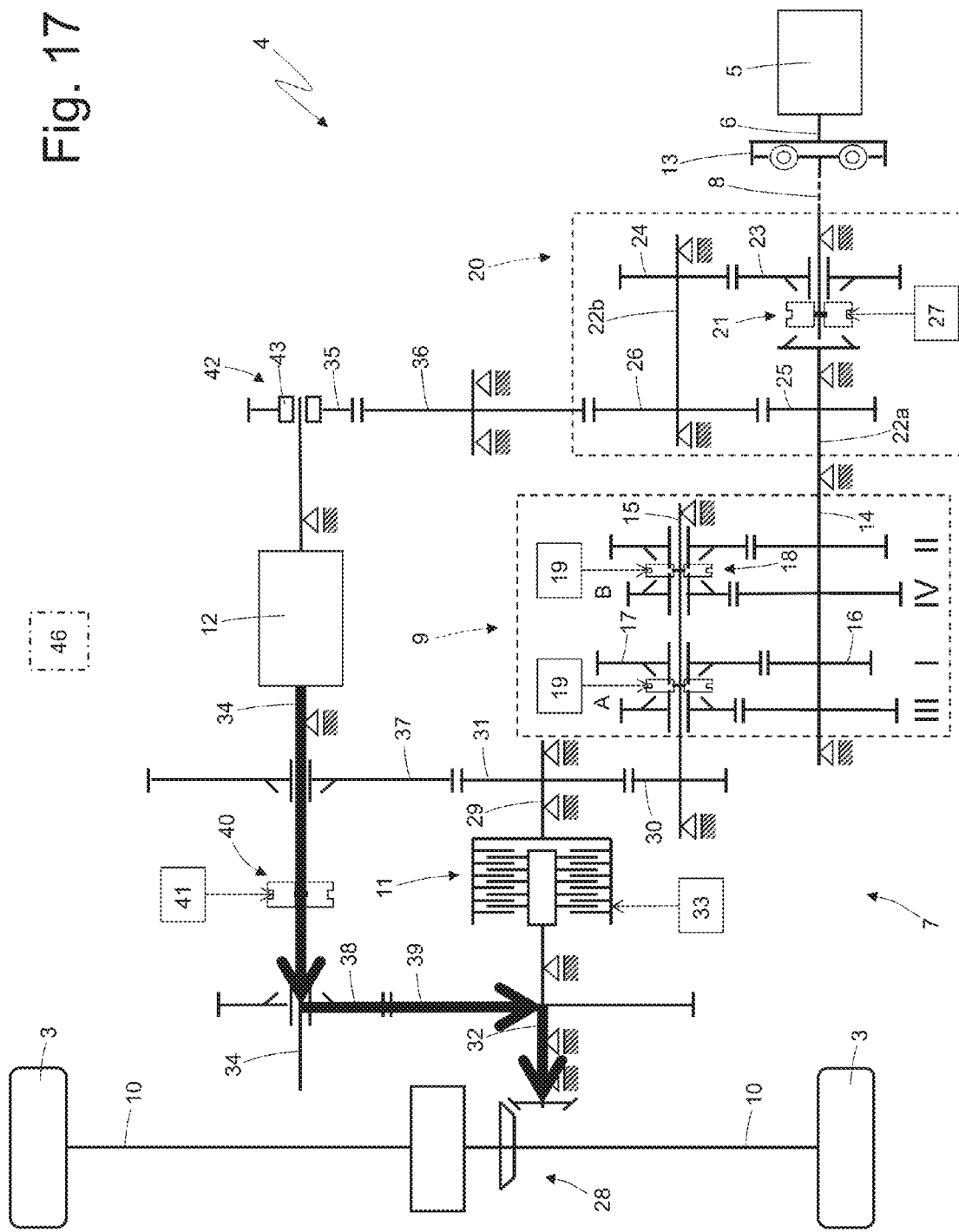

FIG. 17 illustrates a first mode of purely electrical motion in which the torque applied to the rear driving wheels 3 originates exclusively from the electrical machine 12 which operates as an engine and the internal combustion engine 5 is switched off (disabled); in this first mode of purely electrical motion, the locking device 40 locks the gear wheel 38 to the auxiliary shaft 34, clutch 11 is open, the locking devices 18 and 21 are in the idle position, and the freewheel 43 does not mesh (that is does not transmit the motion).

Figure 18:
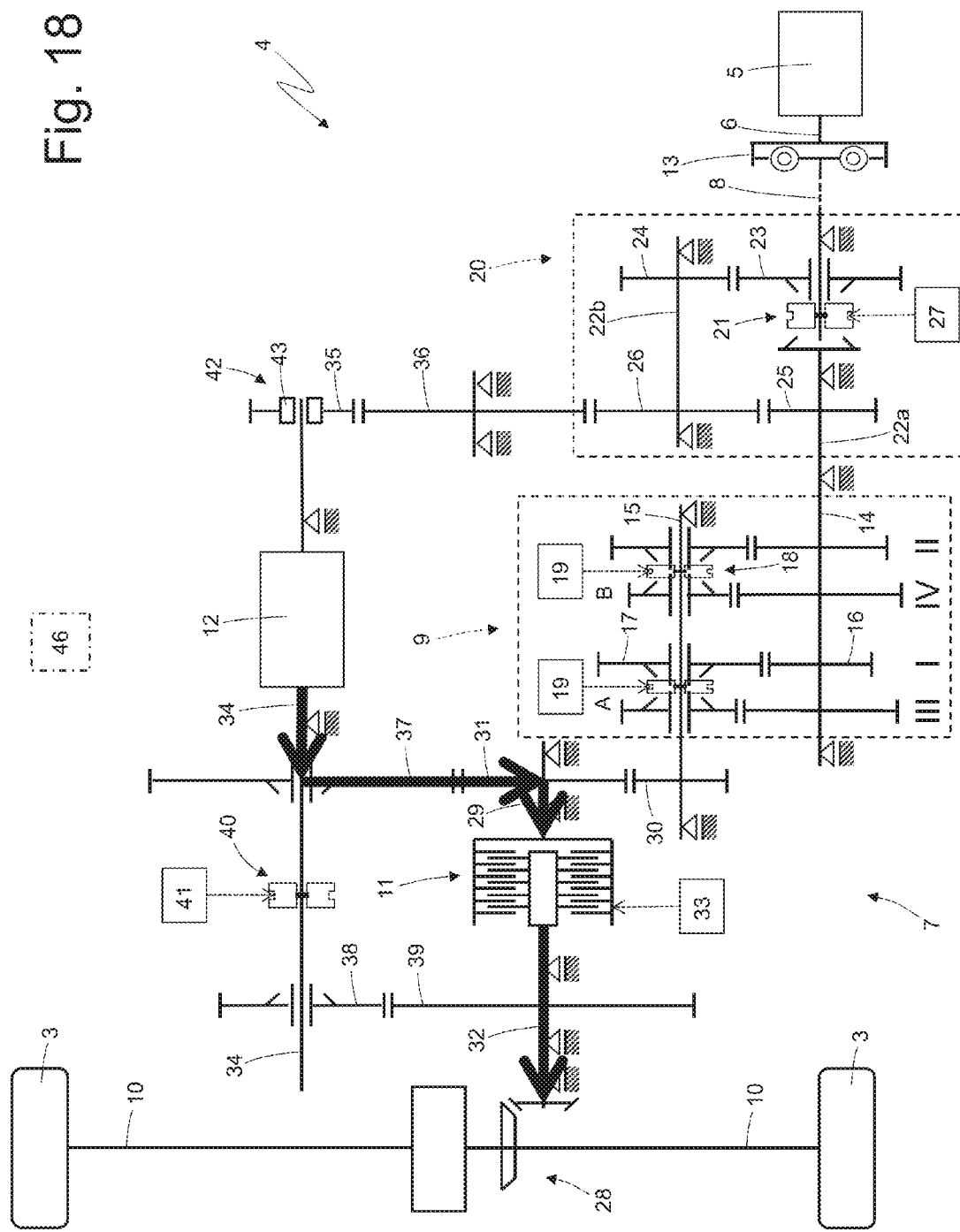

FIG. 18 illustrates a second mode of purely electrical motion in which the torque applied to the rear driving wheels 3 originates exclusively from the electrical machine 12 which operates as an engine and the internal combustion engine 5 is switched off (disabled); in this second mode of purely electrical motion, the locking device 40 locks the gear wheel 37 to the auxiliary shaft 34, clutch 11 is closed, the locking devices 18 and 21 are in the idle position, and the freewheel 43 does not mesh (that is does not transmit the motion).

Figure 19:
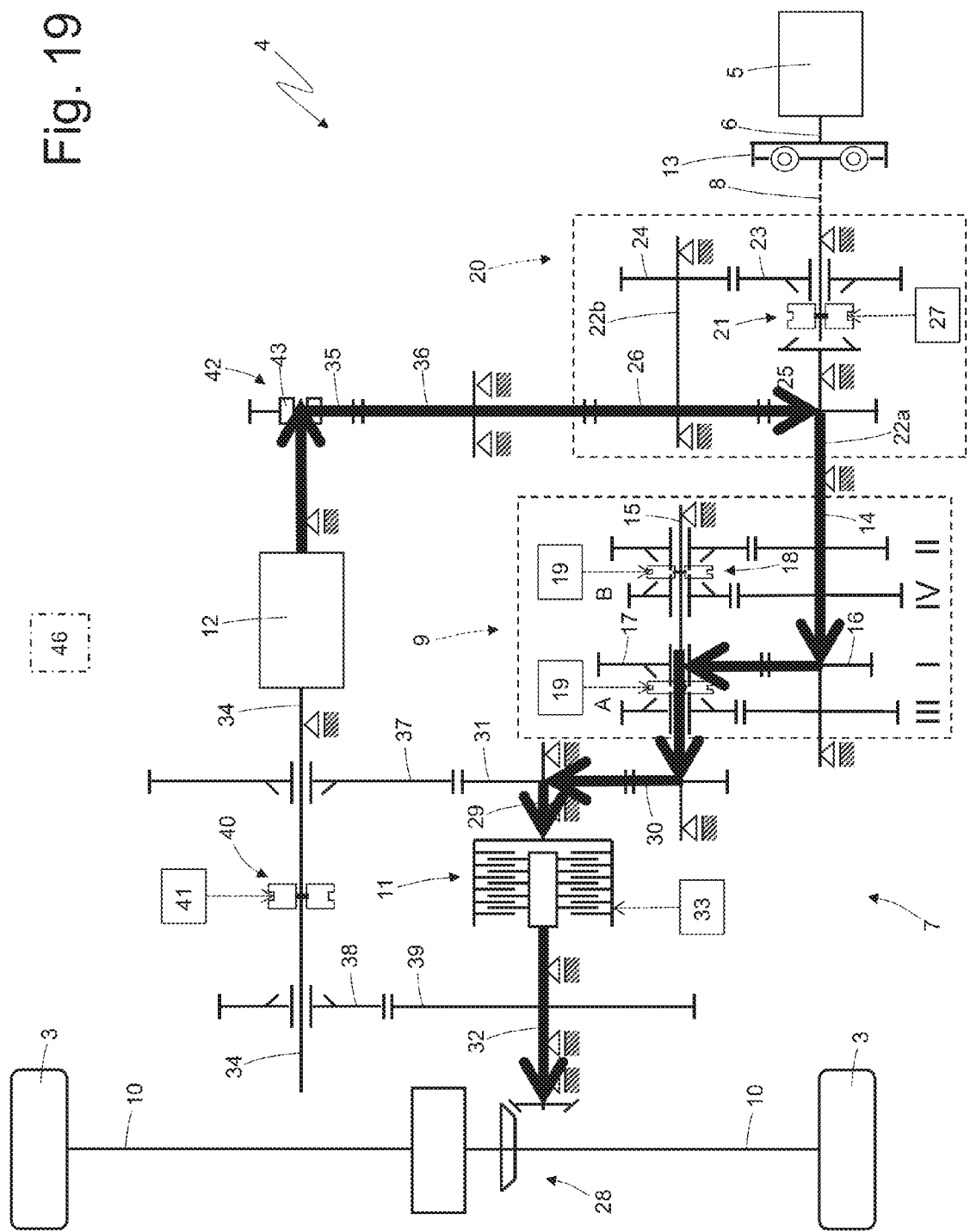

FIG. 19 illustrates a third mode of purely electrical motion in which the torque applied to the rear driving wheels 3 originates exclusively from the electrical machine 12 which operates as an engine and the internal combustion engine 5 is switched off (disabled); in this third mode of purely electrical motion, the locking devices 21 and 40 are in idle position, clutch 11 is closed, the locking device 18 engages (for example) pair I of gears of gearbox 9 (obviously another pair of gears could be used), and the freewheel 43 meshes (that is transmits the motion).

Figure 20:
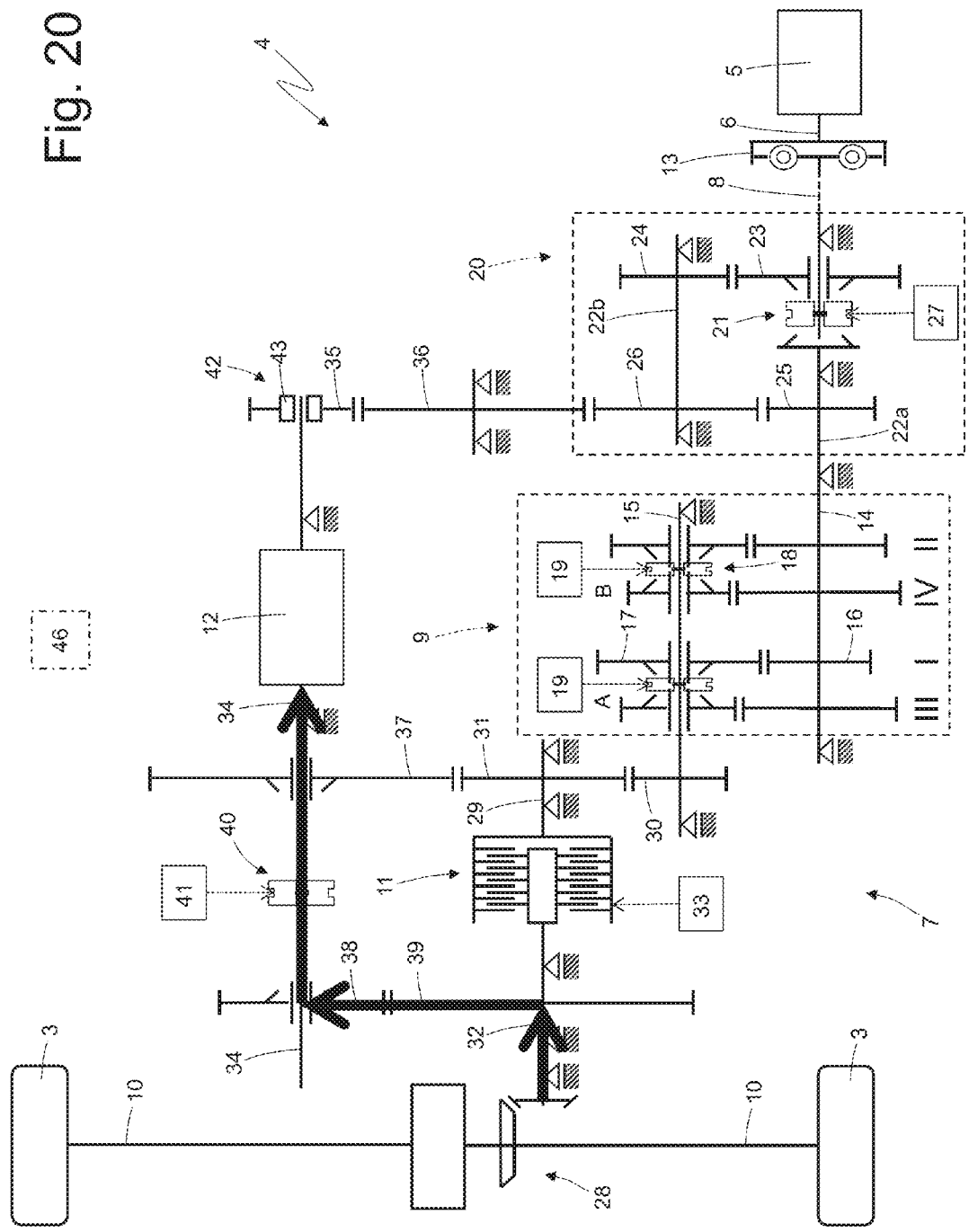

FIG. 20 illustrates a first mode of regenerative braking in which the electrical machine 12 is caused to operate as a generator for receiving, from the rear driving wheels 3, a braking torque which slows down car 1; in this first mode of regenerative braking, the locking device 40 locks the gear wheel 38 to the auxiliary shaft 34, clutch 11 is open, the locking devices 18 and 21 are in the idle position, and the freewheel 43 does not mesh (that is does not transmit the motion).

FIG. 21 illustrates a second mode of regenerative braking in which the electrical machine 12 is caused to operate as a generator for receiving, from the rear driving wheels 3, a braking torque which slows down car 1; in this second mode of regenerative braking, the locking device 40 locks the gear wheel 37 to the auxiliary shaft 34, clutch 11 is closed, the locking devices 18 and 21 are in the idle position, and the freewheel 43 does not mesh (that is does not transmit the motion).

According to an embodiment, the electrical machine 12 can be caused to operate as an engine to carry out the reverse movement of car 1 (the direction of rotation of the electrical machine 12 is easily reversible) and therefore reverse gear is not provided in gearbox 9. Moreover, according to an embodiment, the electrical machine 12 can be caused to operate as an engine to compensate for the "torque gap" to the rear driving wheels 3 when clutch 11 is opened to vary the gear ratio of gearbox 9 and/or of the drive device 20.

In the embodiment illustrated in the accompanying figures, clutch 11 is arranged in an unconventional position (i.e. downstream of the secondary shaft 15 of gearbox 9 between gearbox 9 and the differential gear 28) in which it poses no type of geometrical restraint on crankshaft 6 and on flywheel 13; thereby, it is possible to reduce the vertical volumes at flywheel 13 and therefore it is possible to lower the entire internal combustion engine 5 by hence lowering the centre of the road vehicle 1.

According to a different embodiment not illustrated, there is no drive device 20, and hence the gears are determined exclusively by gearbox 9.

The automatic manual transmission 7 described above has several advantages as it allows an increased number of gears to be obtained within contained size, weight and costs and, at the same time, allows the electrical machine 12 to be mechanically connected to cause car 1 to be hybrid so that the electrical machine 12 effectively and energetically carries out various functions.

In particular, by overlapping the gear ratio series of gearbox 9, the drive device 20 with variable gear ratio acts as a multiplier and allows the number of gears to be multiplied while at the same time containing the number of pairs of gears 16 and 17 and of locking devices 18 of gearbox 9. For example, in the embodiment illustrated in the accompanying drawings, the two-ratio drive device 20 globally allows an eight-gear automatic manual transmission 7 to be obtained with only four pairs of gears 16 and 17 and two devices 18 for engaging gearbox 9; the drive device 20 comprises two pairs of gears and the locking device 21 and therefore globally the eight-gear automatic manual transmission 7 comprises five pairs of gears and three locking devices 18 and 21. A similar conventional eight-gear automatic manual transmission would consist of eight pairs of gears and four locking devices; it is therefore apparent that two pairs of gears (from eight to six) and one locking device (from four to three) are saved in the above-described automatic manual transmission 7.

The invention claimed is:

1. An automatic manual transmission for a hybrid car provided with an internal combustion engine and with an electrical machine; the automatic manual transmission comprising:
a single-clutch mechanical gearbox, which is provided with: one primary shaft, which is suited to receive a torque from a crankshaft of the internal combustion engine, one secondary shaft, which is suited to transmit the torque to driving wheels, a plurality of pairs (I, II, III, IV) of gears, each of which has a corresponding gear ratio and comprises a primary gear, which is mounted on the primary shaft, and a secondary gear, which is mounted on the secondary shaft and meshes, in a permanent manner, with the primary gear, and a plurality of first servo-assisted locking devices, each of which is mounted on a shaft and is suited to be actuated so as to lock at least one corresponding gear to the shaft;
a plurality of first actuators, each of which is coupled to a corresponding first locking device, so as to actuate the locking device;
a differential gear, which receives the motion from the secondary shaft of the gearbox and transmits the motion to driving wheels;
one clutch, which is interposed between the one secondary shaft of the gearbox and the differential gear;
a second actuator, which is coupled to the clutch, so as to open and close the clutch;
an auxiliary shaft, which is different and separate from the primary shaft and from the secondary shaft and along which the electrical machine is mounted;
a first gear train, which is different and separate from the pairs (I, II, III, IV) of gears of the gearbox and connects a first end of the auxiliary shaft, which is arranged upstream of the electrical machine, to the primary shaft of the gearbox; and
a second gear train, which is different and separate from the pairs (I, II, III, IV) of gears of the gearbox and connects a second end of the auxiliary shaft, which is arranged downstream of the electrical machine, to an output shaft of the clutch.

2. The automatic manual transmission according to claim 1 and comprising:
a third gear train, which connects the second end of the auxiliary shaft, which is arranged downstream of the electrical machine, to an input shaft of the clutch;
a second locking device, which is suited to alternatively lock the second gear train or the third gear train to the auxiliary shaft; and
a third actuator, which is coupled to the second locking device, so as to actuate the second locking device.

3. The automatic manual transmission according to claim 1 and comprising a disconnecting device, which is suited to separate the auxiliary shaft from the primary shaft of the gearbox.

4. The automatic manual transmission according to claim 3, wherein the disconnecting device is passive and comprises a freewheel, which transmits the motion when it rotates in a certain direction and does not transmit the motion when in rotates in the opposite direction.

5. The automatic manual transmission according to claim 4, wherein the freewheel presents a centrifugal disconnection, which allows motion to be transmitted only when the rotation speed is lower than a predetermined maximum rotation speed.

6. The automatic manual transmission according to claim 3, wherein the disconnecting device is active and comprises a servo-assisted clutch and a fourth actuator, which acts on the clutch so as to open and close the clutch.

7. The automatic manual transmission according to claim 1, wherein:
the second gear train comprises a first gear wheel, which is mounted idle on the auxiliary shaft, and a second gear wheel, which is splined to an input shaft of the clutch and meshes with the first gear wheel; and
a third gear wheel is provided, which meshes with the second gear wheel and is integral to the secondary shaft of the gearbox, so as to cause the input shaft of the clutch to be angularly integral to the secondary shaft of the gearbox.

8. The automatic manual transmission according to claim 1 and comprising:
a servo-assisted drive device with a variable gear ratio, which is interposed between a drive shaft, which is suited to receive the torque from the crankshaft of the internal combustion engine, and the primary shaft of the gearbox and can be adjusted so as to present two different gear ratios: a first even direct drive gear ratio and a second increased gear ratio; and
a fifth actuator, which is coupled to the drive device, so as to vary the gear ratio of the drive device.

9. The automatic manual transmission according to claim 8, wherein the first gear train is fitted to the drive device.

10. The automatic manual transmission according to claim 8, wherein the drive device comprises:
- a first shaft, which is angularly integral to the primary shaft of the gearbox, faces the drive shaft and is coaxial thereto;
- a second shaft, which is parallel to the first shaft;
- a fourth gear wheel, which is mounted idle around the drive shaft;
- a fifth gear wheel, which is integral to the second shaft and meshes with the fourth gear wheel;
- a sixth gear wheel, which is integral to the first shaft;
- a seventh gear wheel, which is integral to the second shaft and meshes with the sixth gear wheel; and
- a locking device, which is suited to be actuated by the fifth actuator so as to alternatively lock the fourth gear wheel to the drive shaft or the first shaft to the drive shaft.

11. The automatic manual transmission according to claim 10, wherein the first gear train comprises:
- an eighth gear wheel, which meshes with the seventh gear wheel; and
- a ninth gear wheel, which meshes with the eighth gear wheel and is mechanically connected to the auxiliary shaft.

12. The automatic manual transmission according to claim 8, wherein the second increased gear ratio of the drive device and the gear ratios of the pairs (I, II, III, IV) of gears of the gearbox present values wherein all the gears that can be obtained by combining any gear ratio of the drive device with any gear ratio of the gearbox present different gear ratios without overlaps.

13. The automatic manual transmission according to claim 8, wherein, in order to perform, in sequence, all the upshifts from a shortest gear to a longest gear, a control unit activates, at each gear shift, the fifth actuator, so as to vary the gear ratio of the drive device, and activates in an alternate manner, i.e. at one gear shift not and at the following gear shift yes, at least one first actuator of a locking device, so as to vary the pair (I, II, III, IV) of gears that is engaged in the gearbox.

14. The automatic manual transmission according to claim 8, wherein, in order to perform, in sequence, all the upshifts from a shortest gear to a longest gear, a control unit activates, at each gear shift, at least one first actuator of a locking device, so as to vary the pair (I, II, III, IV) of gears that is engaged in the gearbox, and activates in an alternate manner, i.e. at one gear shift not and at the following gear shift yes, the fifth actuator, so as to vary the gear ratio of the drive device.

15. The automatic manual transmission according to claim 8, wherein:
- all the gears are divided into a lower group and an upper group, so that a longest gear of the lower group presents a shorter gear ratio with respect to a shortest gear of the upper group;
- in order to perform a gear shift within a same group, a control unit exclusively activates at least one first actuator of a locking device, so as to vary the pair (I, II, III, IV) of gears that is engaged in the gearbox; and
- in order to perform a gear shift between a gear of the lower group and a gear of the upper group, the control unit simultaneously activates at least one first actuator of a locking device, so as to vary the pair (I, II, III, IV) of gears that is engaged in the gearbox, and the fifth actuator, so as to vary the gear ratio of the drive device.

* * * * *